(12) United States Patent
Shimoyama et al.

(10) Patent No.: US 8,045,825 B2
(45) Date of Patent: Oct. 25, 2011

(54) IMAGE PROCESSING APPARATUS AND METHOD FOR COMPOSITION OF REAL SPACE IMAGES AND VIRTUAL SPACE IMAGES

(75) Inventors: Tomohiko Shimoyama, Tokyo (JP); Takuya Tsujimoto, Kawasaki (JP); Tomohiko Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 853 days.

(21) Appl. No.: 12/108,887

(22) Filed: Apr. 24, 2008

(65) Prior Publication Data
US 2008/0267523 A1 Oct. 30, 2008

(30) Foreign Application Priority Data
Apr. 25, 2007 (JP) ................. 2007-115989

(51) Int. Cl.
G06K 9/00 (2006.01)
G06K 9/20 (2006.01)
G06K 9/34 (2006.01)
G06K 9/36 (2006.01)
G09G 5/00 (2006.01)

(52) U.S. Cl. ........ 382/284; 382/164; 382/165; 382/282; 382/283; 345/629; 345/632; 345/634

(58) Field of Classification Search .............. None
See application file for complete search history.

(56) References Cited

U.S. PATENT DOCUMENTS

| 6,064,749 A * | 5/2000 | Hirota et al. ............. 382/103 |
| 2005/0069223 A1* | 3/2005 | Tanimura et al. ............. 382/284 |
| 2007/0188522 A1* | 8/2007 | Tsuyuki ............. 345/632 |
| 2007/0242086 A1* | 10/2007 | Tsujimoto et al. ............. 345/632 |
| 2007/0268316 A1* | 11/2007 | Kajita et al. ............. 345/642 |

FOREIGN PATENT DOCUMENTS

JP 04-035279 2/1992

OTHER PUBLICATIONS

Kanbara, M.; Okuma, T.; Takemura, H.; Yokoya, N.;"Real-time composition of stereo images for video see-through augmented reality", IEEE International Conference on Multimedia Computing and Systems, 1999. pp. 213-219 vol. 1.*

M Bajura, et al. "Merging virtual objects with the real world: seeing ultrasound imagery within the patient", Proc. SIGGRAPH, vol. 26, 1992.*

* cited by examiner

*Primary Examiner* — Samir Ahmed
*Assistant Examiner* — Li Liu
(74) *Attorney, Agent, or Firm* — Cowan, Liebowitz & Latman, P.C.

(57) ABSTRACT

A left-eye color discrimination unit (1101) and right-eye color discrimination unit (1102) generate mask images from virtual space images. If an error part exists at the boundary between a chroma key region and non-chroma key region in the mask image, each of a left-eye mask correction unit (1108) and right-eye mask correction unit (1110) corrects the error part using another mask image generated based on the other virtual space image in addition to the virtual space image.

13 Claims, 19 Drawing Sheets

FIG. 8A
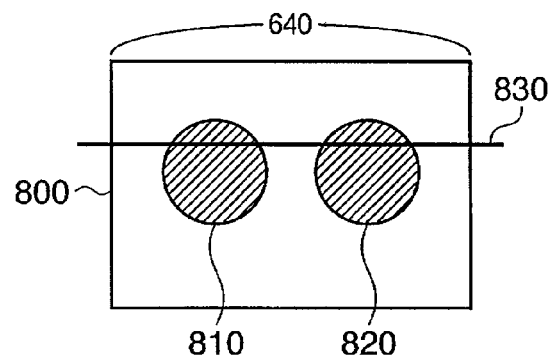
FIG. 8B
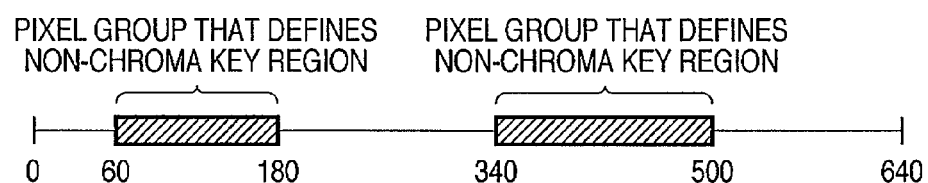
FIG. 8C
| START POSITION | END POSITION |
|---|---|
| 60 | 180 |
| 340 | 500 |
|  |  |
|  |  |

F I G. 11
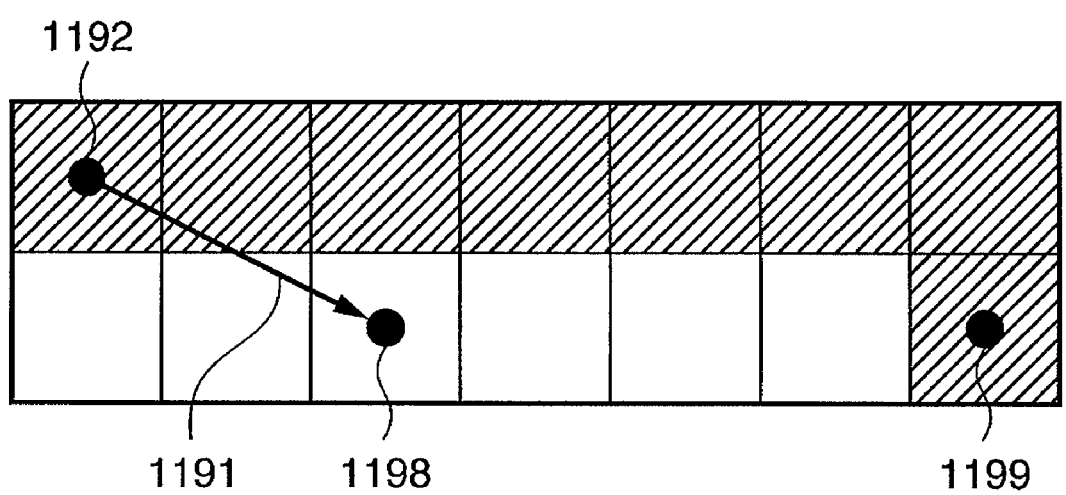

F I G. 12
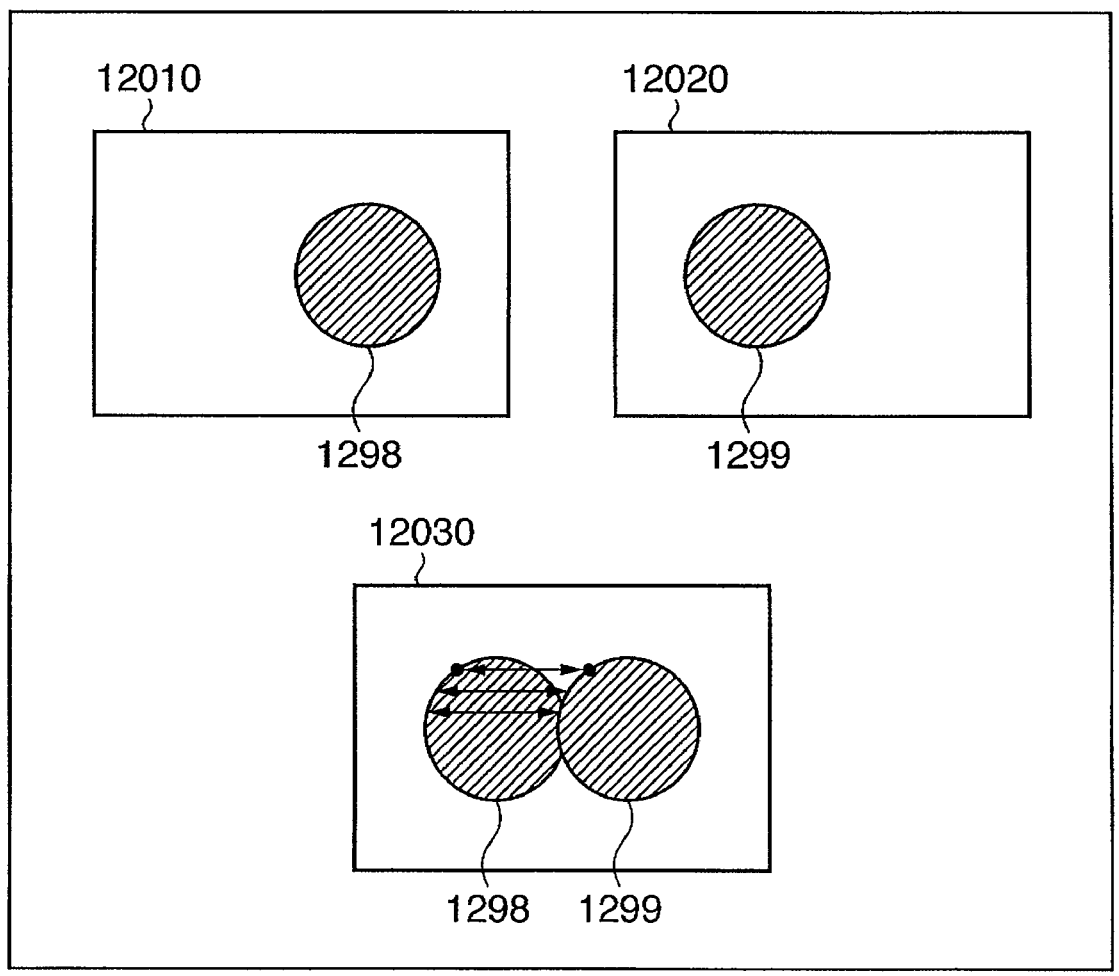

IMAGE PROCESSING APPARATUS AND METHOD FOR COMPOSITION OF REAL SPACE IMAGES AND VIRTUAL SPACE IMAGES

BACKGROUND OF THE INVENTION

1. Field of the Invention

The present invention relates to a chroma key composition technique.

2. Description of the Related Art

Chroma key composition is a technique for compositing images by overwriting an image from which a region except for a region having a specific color is extracted on another image.

In order to accurately attain the chroma key composition, a region having a specific color needs to be accurately detected. Especially, the contour of the region having the specific color needs to be accurately detected so as to obtain a pleasing appearance of a composite image.

As a conventional technique for accurately detecting the contour for the purpose of chroma key composition, a method of calculating a rough position of a region having a specific color based on color information, and calculating its outline from luminance information has been proposed, as disclosed in patent reference 1.

[Patent Reference 1] Japanese Patent Laid-Open No. 4-35279

However, the conventional chroma key composition is done under the assumption that an image including a region having a specific color is free from noise, and it is difficult to apply if an image is noisy.

For example, noise is generated in an image when an image is transferred via a wireless communication. Upon transferring an image via a wireless communication, if that image picks up atmosphere noise during transfer, the image suffers any loss of information (noise).

In addition, if an image has significant noise, the color of the image is different from an original color, and detection of a region having a specific color often fails upon the chroma key composition. For this reason, the chroma key composition cannot be normally done for noisy images.

SUMMARY OF THE INVENTION

It is desirable to solve one or more of the aforementioned problems. It is also desirable to provide a technique for attaining accurate chroma key composition such that even when an image including a region having a chroma key color has noise or the like, this image is corrected using another image to remove this noise or the like.

According to one aspect of the present invention an image processing apparatus, comprises:

a real-space image acquisition unit operable to acquire a real space image;

a virtual space image acquisition unit configured to acquire a first virtual space image including a chroma key region defined by a pixel group having a chroma key color which is set in advance;

a composition unit operable to execute chroma key composition of the first virtual space image on the real space image based on the chroma key color included in the first virtual space image; and an output unit adapted to output, to a display device, a composite image generated by the chroma key composition processing of the composition unit, the image processing apparatus characterized by further comprising:

a determination unit configured to determine whether or not an error part exists at a boundary between the chroma key region and a non-chroma key region, based on a second virtual space image acquired by the virtual space image acquisition unit; and a correction unit operable to correct the error part, if the determination unit determines that the error part exists, based on a chroma key region of the second virtual space image.

According to another aspect of the present invention an image processing method, comprises:

acquiring a real space image;

acquiring a first virtual space image including a chroma key region defined by a pixel group having a chroma key color which is set in advance;

executing chroma key composition of the first virtual space image on the real space image based on the chroma key color included in the first virtual space image; and outputting a composite image generated by the chroma key composition processing in the composition step to a display device, the method characterized by further comprising:

determining based on a second virtual space image, acquired in the virtual space image acquisition step whether or not an error part exists at a boundary between the chroma key region and a non-chroma key region; and correcting, if it is determined in the determination step that the error part exists, the error part based on a chroma key region of the second virtual space image.

According to still another aspect of the present invention a machine-readable storage device storing a computer program which when loaded into a computer and executed performs an image processing method, the method comprises:

acquiring a real space image;

acquiring a first virtual space image including a chroma key region defined by a pixel group having a chroma key color which is set in advance;

executing chroma key composition of the first virtual space image on the real space image based on the chroma key color included in the first virtual space image; and outputting a composite image generated by the chroma key composition processing in the composition step to a display device, the method characterized by further comprising:

determining based on a second virtual space image, acquired in the virtual space image acquisition step whether or not an error part exists at a boundary between the chroma key region and a non-chroma key region; and correcting, if it is determined in the determination step that the error part exists, the error part based on a chroma key region of the second virtual space image.

Further features of the present invention will become apparent from the following description of exemplary embodiments with reference to the attached drawings.

BRIEF DESCRIPTION OF THE DRAWINGS

FIGS. 8A to 8C are views for explaining processing for specifying non-chroma key regions on lines upon referring to identical lines of right- and left-eye mask images;

FIG. 11 is a view for explaining processing for correcting a line of the start position which is registered in an n-th row of a left-eye table;

FIG. 12 is a view for explaining the disparity between the right-eye CG image and left-eye mask image;

DESCRIPTION OF THE EMBODIMENTS

Preferred embodiments of the present invention will now be described in detail with reference to the accompanying drawings. Note that these embodiments will be described as examples of preferred arrangements of the invention described in the scope of claims, and such invention is not limited to the embodiments to be described hereinafter.

First Embodiment

A CG (Computer Graphics) image (virtual space image) used in this embodiment includes a region defined by a pixel group having a chroma key color which is set in advance. In this embodiment, an image formed by chroma-key compositing a CG image (virtual space image) generated to be presented to the right eye of a user and a real space image is presented to the right eye of this user. Furthermore, an image formed by chroma-key compositing a CG image (virtual space image) generated to be presented to the left eye and a real space image is presented to the left eye of this user.

This embodiment is characterized by the following configuration under the precondition of the above configuration. That is, even when an error part is generated at a boundary between a chroma key region and non-chroma key region in a CG image generated to be presented to one eye during chroma key processing, satisfactory chroma key composition results are presented to the respective eyes by using the nature that CG images to be presented to the respective eyes are similar to each other.

Figure 1:
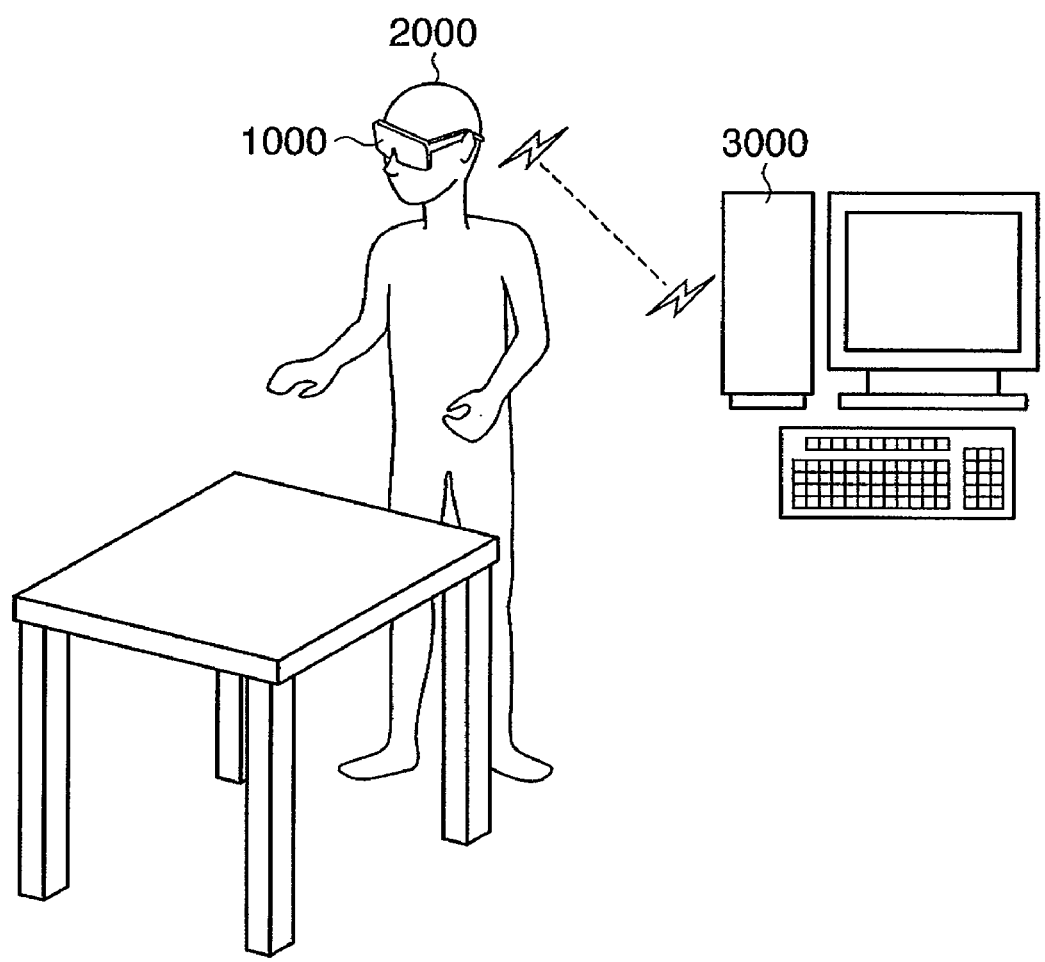
FIG. 1 shows a system according to the first embodiment of the present invention.

FIG. 1 shows a state in which a user uses a system according to this embodiment. The configuration itself of this system is a known MR (Mixed Reality) system.

Referring to FIG. 1, reference numeral 1000 denotes a video see-through type HMD (Head Mounted Display) which serves as an image processing apparatus, and can comprise a known head mounted type display device. Reference numeral 2000 denotes a user who wears the HMD 1000 on the head. The detailed arrangement of the HMD 1000 will be described later. The HMD 1000 has a screen used to present an image to the right eye of the user 2000, and that used to present an image to the left eye. Therefore, the user 2000 can view images corresponding to the respective eyes in front of the eyes by observing the respective screens with the right and left eyes.

Reference numeral 3000 denotes a computer, which generates a CG image to be presented to the right eye of the user 2000 (right-eye CG image), and a CG image to be presented to the left eye. The computer 3000 wirelessly transmits the respective generated CG images to the HMD 1000. Before transmitting the CG images, the computer 3000 compresses the CG images to be transmitted so as to reduce the wireless communication band. The HMD 1000 uses the compressed CG images after it decompresses them.

When the computer 3000 wirelessly transmits the compressed right- and left-eye CG images to the HMD 1000, and the HMD 1000 receives and handles these CG images, noise may be superposed on the CG images to be handled (image information may also be lost). This is caused by wireless transmission of the CG images, and decompression of the compressed CG images, as described above. Especially, each CG image includes a chroma key region, as described above. Therefore, when noise is generated at a boundary between a chroma key region and non-chroma key region (an error part is generated at the boundary), even when this CG image is chroma-key composited to a real space image, noise is also generated in the composition result at the boundary.

In this embodiment, by using the nature that right- and left-eye CG images are similar images, even when an error part is generated at the boundary between a chroma key region and non-chroma key region in one CG image, the error part is corrected using the other CG image. In this way, a satisfactory chroma key composition result is obtained.

Figure 3:
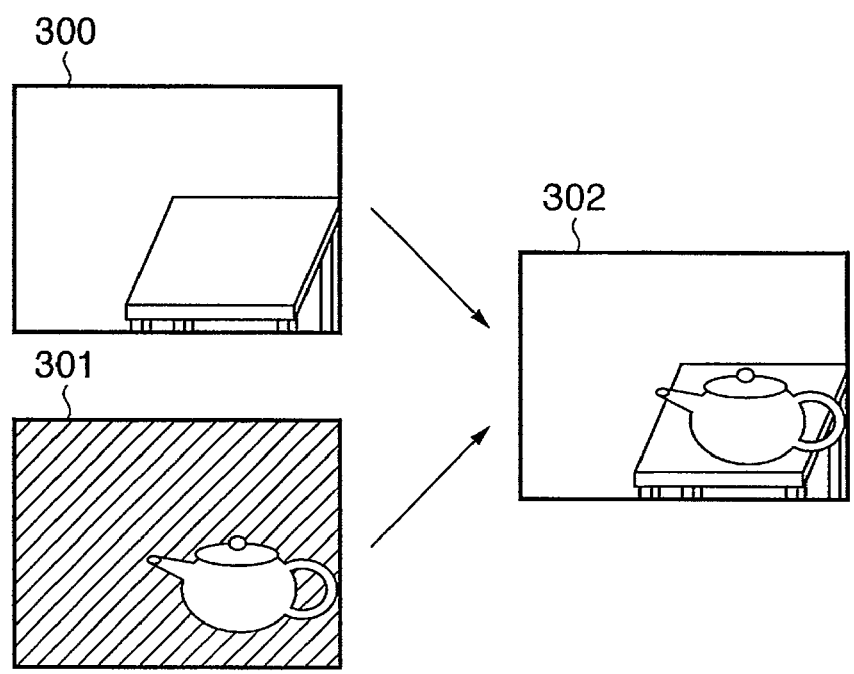
FIG. 3 is a view for explaining general chroma key composition processing.

FIG. 3 is a view for explaining general chroma key composition processing. Referring to FIG. 3, reference numeral 300 denotes a real space image. Reference numeral 301 denotes a CG image, the hatched portion of which indicates a chroma key region. Reference numeral 302 denotes an image (composite image) formed by chroma-key compositing the CG image 301 and real space image 300. That is, the composite image 302 is formed by setting the chroma key region to be transparent upon composition when the CG image 301 is superimposed on the real space image 300.

Figure 4:
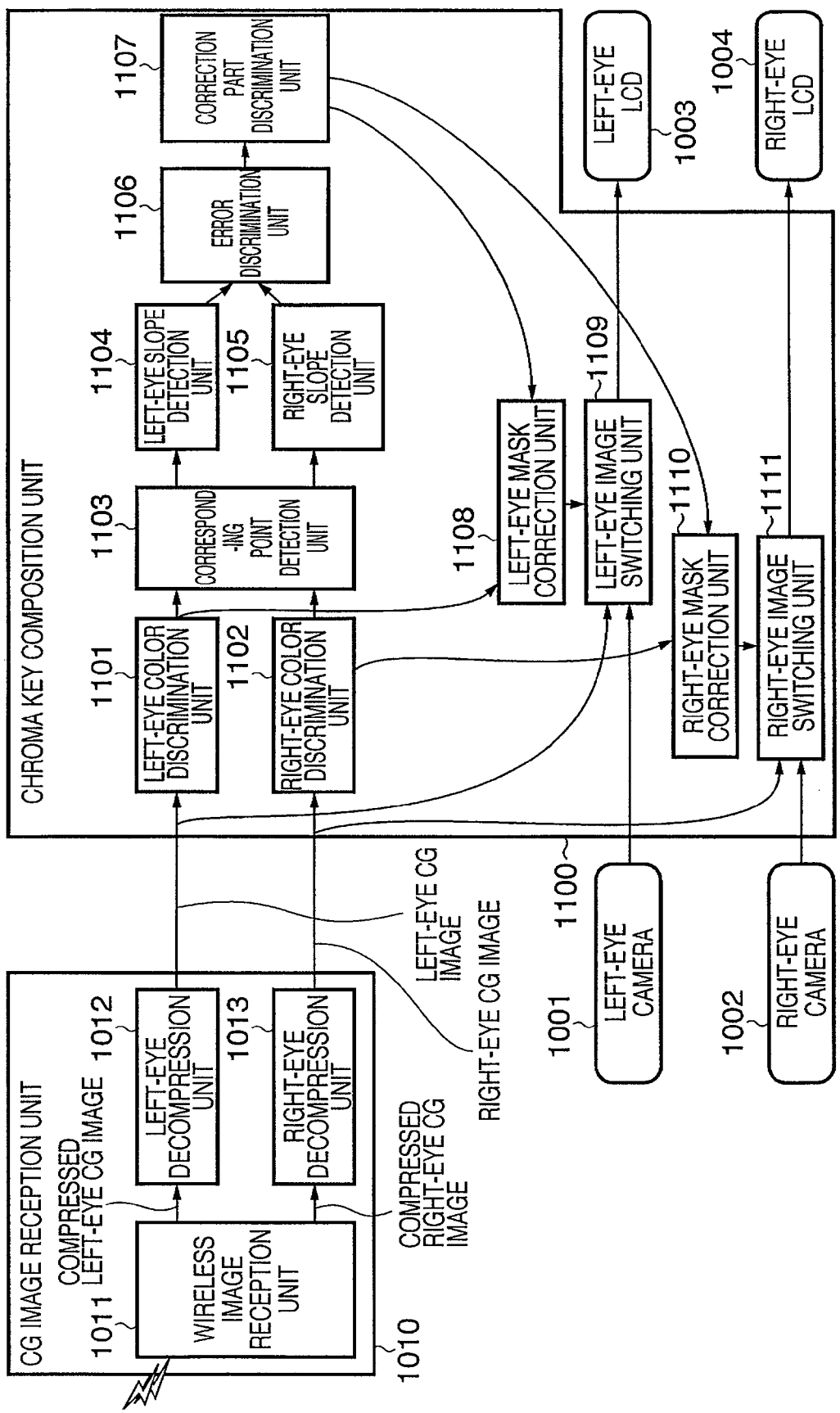
FIG. 4 is a block diagram showing the functional arrangement of the HMD 1000.

FIG. 4 is a block diagram showing the functional arrangement of the HMD 1000. As shown in FIG. 4, the HMD 1000 comprises a CG image reception unit 1010, left-eye camera 1001, right-eye camera 1002, chroma key composition unit 1100, left-eye LCD (liquid crystal display) 1003, and right-eye LCD 1004.

Figure 2:
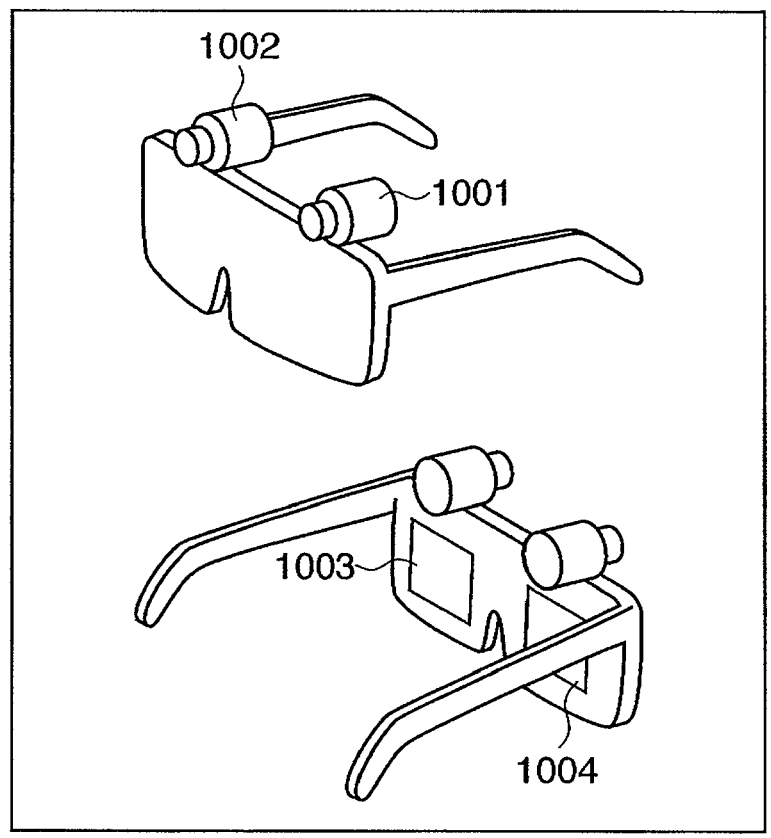
FIG. 2 shows an example of the outer appearance of a head mounted display (HMD) 1000.

FIG. 2 shows an example of the outer appearance of the HMD 1000. As shown in FIG. 2, the right- and left-eye cameras 1002 and 1001 are respective mounted at neighboring positions of the right- and left-eye LCDs 1004 and 1003. The right- and left-eye cameras 1002 and 1001 respectively capture a movie of a real space, and images of captured frames are input to the chroma key composition unit 1100 shown in FIG. 4.

Of the arrangement of the HMD 1000 shown in FIG. 4, the CG image reception unit 1010 will be described first.

As shown in FIG. 4, the CG image reception unit 1010 comprises a wireless image reception unit 1011, left-eye decompression unit 1012, and right-eye decompression unit 1013.

The right- and left-eye CG images (compressed) wirelessly transmitted from the computer 3000 (external apparatus) are received by the wireless image reception unit 1011. The wireless image reception unit 1011 transfers the received right- and left-eye CG images to the right- and left-eye decompression units 1013 and 1012, respectively.

As described above, noise due to the wireless communication is likely to be superposed on the right- and left-eye CG images received by the wireless image reception unit 1011. When the received information is lost due to the wireless communication, the wireless image reception unit 1011 interpolates such loss by known techniques. Hence, the CG images transmitted from the computer 3000 and those output from the wireless image reception unit 1011 may have an unintended difference.

The left-eye decompression unit 1012 decompresses the compressed left-eye CG image, and outputs the decompressed left-eye CG image to a subsequent left-eye color discrimination unit 1101 and left-eye image switching unit 1109. Likewise, the right-eye decompression unit 1013 decompresses the compressed right-eye CG image, and outputs the decompressed right-eye CG image to a subsequent right-eye color discrimination unit 1102 and right-eye image switching unit 1111.

As described above, noise due to image decompression is likely to be superposed on the CG images decompressed by the right- and left-eye decompression units 1013 and 1012.

The chroma key composition unit 1100 will be described next. As shown in FIG. 4, the chroma key composition unit 1100 comprises the left-eye color discrimination unit 1101, the right-eye color discrimination unit 1102, a corresponding point detection unit 1103, a left-eye slope detection unit 1104, a right-eye slope detection unit 1105, an error discrimination unit 1106, and a correction part discrimination unit 1107. Furthermore, the chroma key composition unit 1100 comprises a left-eye mask correction unit 1108, the left-eye image switching unit 1109, a right-eye mask correction unit 1110, and the right-eye image switching unit 1111.

Figure 5:
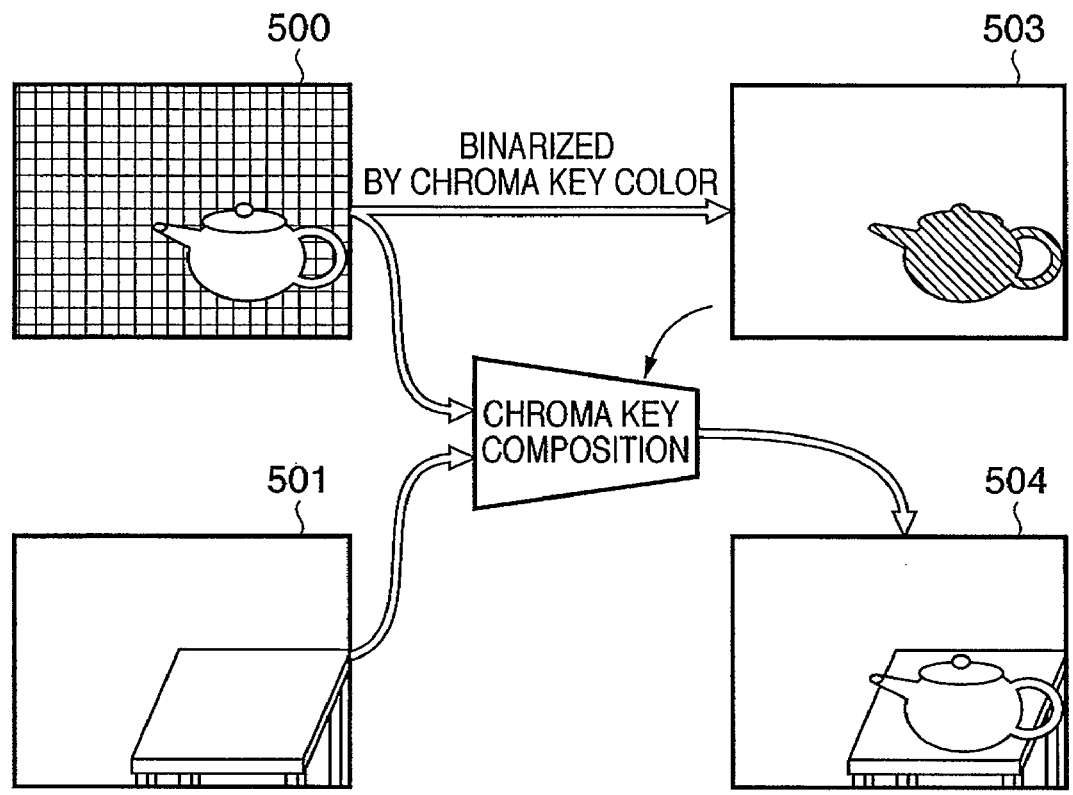
FIG. 5 illustrates chroma key composition processing executed by a chroma key composition unit 1100.

The basic operation of the chroma key composition unit 1100, i.e., the operation of the chroma key composition unit 1100 when the unit 1100 executes conventional chroma key composition processing regardless of noise on the CG images, will be described first with reference to FIGS. 4 and 5. FIG. 5 shows the chroma key composition processing executed by the chroma key composition unit 1100.

The decompressed left-eye CG image output from the left-eye decompression unit 1012 is output to the left-eye color discrimination unit 1101 and left-eye image switching unit 1109, as described above.

The left-eye color discrimination unit 1101 refers to pixel values of pixels which form the decompressed left-eye CG image, and checks if each referred pixel value indicates a chroma key color which is set in advance. The left-eye color discrimination unit 1101 assigns a bit "1" to a pixel having a pixel value which indicates the chroma key color, and a bit "0" to a pixel having a pixel value that does not indicate the chroma key color.

For example, when a pixel value is defined by 8 bits, the chroma key color may be specified by R=0, G=0, and B>250. In this case, the left-eye color discrimination unit 1101 assigns a bit "1" to a pixel having a pixel value which satisfies R=0, G=0, and B>250, and a bit "0" to a pixel having a pixel value which does not satisfy this condition, of pixels which form the left-eye CG image. That is, the left-eye color discrimination unit 1101 generates a binary image in which the pixel values of pixels within a chroma key region in the left-eye CG image are substituted by "1", and those of pixels outside the chroma key region are substituted by "0". This binary image will be referred to as a "mask image" hereinafter. Note that this mask image need not to be stored for one frame, and suffices to be stored as a selection image in a buffer for several lines required for processing.

Referring to FIG. 5, reference numeral 500 denotes a CG image, the hatched portion of which is a chroma key region. Therefore, in this case, a bit "1" is assigned to each of pixels which form the hatched portion, and a bit "0" is assigned to each of pixels which form a portion other than the hatched portion. Reference numeral 503 denotes a mask image formed by a set of such bits.

On the other hand, since the right-eye color discrimination unit 1102 receives the decompressed right-eye CG image output from the right-eye decompression unit 1013, the right-eye color discrimination unit 1102 executes the same processing as in the left-eye color discrimination unit 1101, and generates a mask image corresponding to the right-eye CG image.

The mask image generated by the left-eye color discrimination unit 1101 is input to the corresponding point detection unit 1103 and left-eye mask correction unit 1108, and the mask image generated by the right-eye color discrimination unit 1102 is input to the corresponding point detection unit 1103 and right-eye mask correction unit 1110. In this case, assume that the right- and left-eye mask correction units 1110 and 1108 do not execute any correction processing since a basic operation of the chroma key composition is to be given. Therefore, the left-eye mask correction unit 1108 outputs the received mask image to the left-eye image switching unit 1109 intact, and the right-eye mask correction unit 1110 outputs the received mask image to the right-eye image switching unit 1111 intact.

On the other hand, the left-eye camera 1001 is used to capture a movie of the real space to be presented to the left eye of the user 2000, and images (real space images) of the captured frames are sequentially input to the left-eye image switching unit 1109, as described above. Also, the right-eye camera 1002 is used to capture a movie of the real space to be presented to the right eye of the user 2000, and images (real space images) of the captured frames are sequentially input to the right-eye image switching unit 1111, as described above. In FIG. 5, reference numeral 501 denotes a real space image captured by the camera.

The left-eye image switching unit 1109 executes a chroma key composition of the left-eye CG image received from the left-eye decompression unit 1012 and the real space image received from the left-eye camera 1001 using the mask image received from the left-eye color discrimination unit 1101. That is, the left-eye image switching unit 1109 decides whether to use, as an x-th ($1 \leq x \leq X$) pixel of a composite image to be generated by the chroma key composition, an x-th pixel of the left-eye CG image or that of the real space image, based on the bit value of the x-th pixel in the mask image. Note that X is the total number of pixels of the left-eye CG image (the same applies to the right-eye CG image and composite image).

When the bit value of the x-th pixel in the mask image is "1", the left-eye image switching unit 1109 uses the x-th pixel in the real space image as that in the composite image. On the other hand, when the bit value of the x-th pixel in the mask image is "0", the left-eye image switching unit 1109 uses the x-th pixel in the left-eye CG image as that in the composite image. In this way, the left-eye image switching unit 1109 selects pixels selectively from the left-eye CG image and real space image in accordance with the bit values that form the mask image to decide pixels of the composite image, thus generating the composite image. Since such chroma key composition processing is known to those who are skilled in the art, no more explanation will be given.

In FIG. 5, reference numeral 504 denotes a composite image generated by the chroma key composition.

The right-eye image switching unit 1111 executes the same processing as the left-eye image switching unit 1109. That is, the right-eye image switching unit 1111 executes the chroma key composition of the right-eye CG image received from the right-eye decompression unit 1013 and the real space image received from the right-eye camera 1002 using the mask image received from the right-eye color discrimination unit 1102.

The composite image generated by the left-eye image switching unit 1109 is output to the left-eye LCD 1003, and the composite image generated by the right-eye image switching unit 1111 is output to the right-eye LCD 1004. In this way, the composite images corresponding to the right and left eyes are displayed in front of the right and left eyes of the user 2000. The composite image is generated by substituting the chroma key region in the CG image by a corresponding region in the real space image for the right and left eyes.

The operation of the chroma key composition unit 1100 for obtaining satisfactory chroma key composition results even when an error part is generated at the boundary between the chroma key region and non-chroma key region using the nature that the right- and left-eye CG images are similar images will be described next.

Figure 6:
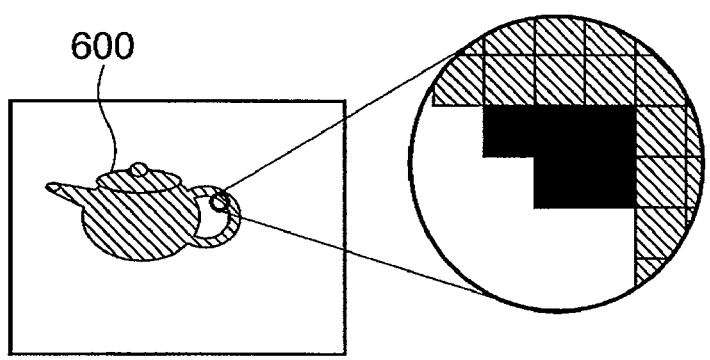
FIG. 6 is a view showing an example in which noise is superposed on a CG image (may be either a right- or left-eye CG image) since image information in that CG image is lost.

FIG. 6 shows an example in which noise is superposed on a CG image due to a loss of image information in the CG image (which may be either the right- or left-eye CG image). As shown in FIG. 6, by enlarging a region of a part of a handle of a tea pot 600 in the CG image, it is found that image information in a portion (black portion) of the chroma key region is lost, and the pixel value of each pixel which forms the lost portion does not satisfy R=0, G=0, and B>250. That is, this portion is no longer the chroma key region.

Therefore, upon executing the chroma key composition of this CG image and real space image, the pixel values of the CG image are left in this black portion intact as noise (error part) on the composite image. This embodiment has as its object to obtain a satisfactory chroma key composition result by correcting this error part. More specifically, the right- and left-eye CG images are compared, and if one CG image includes an error part, this error part is corrected using the other CG image.

Figure 7:
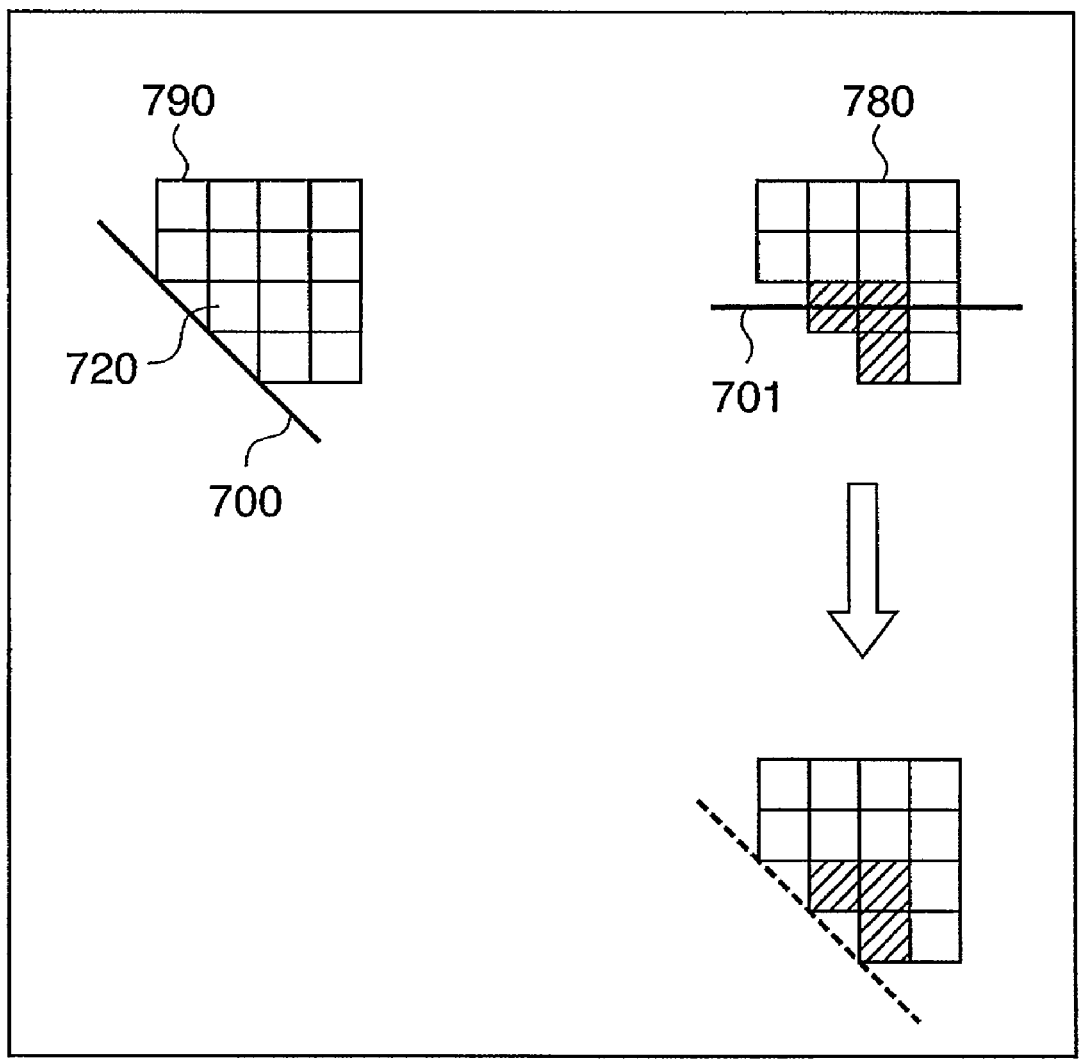
FIG. 7 is a view for explaining correction of an error part.

The correction method of an error part according to this embodiment will be briefly described below. FIG. 7 is a view for explaining correction of an error part. Referring to FIG. 7, reference numeral 790 denotes a portion (pixel group) of a non-chroma key region which has a common boundary with a chroma key region in a mask image (left-eye mask image) generated from a left-eye CG image. Reference numeral 780 denotes a portion (pixel group) of a non-chroma key region which has a common boundary with a chroma key region in a mask image (right-eye mask image) generated from a right-eye CG image. A pixel group indicated by hatching in the pixel group 780 corresponds to an error part.

Initially, a slope (that of a line 700) of the boundary at a pixel 720, which is in contact with the chroma key region, of the pixel group 790 is calculated. Also, a slope (that of a line 701) of the boundary at a pixel, the position of which corresponds to the pixel 720 (corresponding pixel), in the pixel group 780 is calculated. Since the right- and left-eye CG images are similar images, it is naturally considered that the respective slopes should be nearly equal to each other. Therefore, if these slopes have a large difference, it is naturally considered that the one of the right- and left-eye CG images includes an error part.

Furthermore, in order to discriminate the right- or left-eye CG image that includes an error part, the slopes calculated for one or more pixels selected before the pixel 720 as those, which are in contact with the chroma key region, of the pixel group 790 are referred to. Then, some differences, i.e., a difference between the slope calculated for the pixel 720 and that calculated for a pixel selected immediately before the pixel 720, a difference between the slope calculated for the pixel 720 and that calculated for a pixel selected two pixels before the pixel 720, and the like, are calculated. It is checked if a change in the difference is equal to or larger than a predetermined change.

Likewise, the slopes calculated for one or more pixels selected before the corresponding pixel as those which are in contact with the chroma key region of the pixel group 780 are referred to. Then, some differences, i.e., a difference between the slope calculated for the corresponding pixel and that calculated for a pixel selected immediately before the corresponding pixel, a difference between the slope calculated for the corresponding pixel and that calculated for a pixel selected two pixels before the corresponding pixel, and the like, are calculated. It is checked if a change in the difference is equal to or larger than a predetermined change.

Then, it is determined that one of the pixel groups 790 and 780 in which it is discriminated as a result of checking that the change in the difference is equal to or larger than the predetermined change includes an error part. In FIG. 7, the pixel group 780 side includes an error part. Therefore, the error part is corrected so that the slope at the corresponding pixel equals that of the line 700.

This processing will be described in more detail below. Note that the operation to be described is executed in addition to the basic operation.

The corresponding point detection unit 1103 receives the right- and left-eye mask images output from the right- and left-eye color discrimination units 1102 and 1101. The corresponding point detection unit 1103 then specifies pixel positions (corresponding positions) on the other mask image, the positions of which correspond to respective pixels that form a portion which have a common boundary with a chroma key region (a region with a bit value "1"), in a non-chroma key region (a region with a bit value "0") on one mask image. Various methods have been proposed for the pixel position specifying processing executed by the corresponding point detection unit 1103, and this method may adopt any of these methods. For example, a method to be described below may be used.

Initially, the following assumptions are made.

The right- and left-eye cameras 1002 and 1001 are ideally parallelly arranged, and an epipolar line is located on identical lines of right and left images.

A region (i.e., a virtual object image) other than the chroma key region in the CG image does not cover the edges of a frame.

Using such assumptions as a precondition, corresponding pixels can be detected by only comparing the right- and left-eye mask images for respective lines.

Upon reception of the right- and left-eye mask images, the corresponding point detection unit 1103 refers to identical lines on the respective mask images, and specifies non-chroma key regions on these lines.

FIGS. 8A to 8C are views for explaining the processing for specifying non-chroma key regions on lines upon referring to identical lines on the right- and left-eye mask images. Note that the processing to be described below using FIGS. 8A to 8C is the same for either the right- or left-eye mask image. Hence, the following description will be given taking the right-eye mask image as an example.

FIG. 8A shows an example of a right-eye mask image 800. In FIG. 8A, the right-eye mask image 800 has a horizontal size of 640 pixels. In the right-eye mask image 800, reference numerals 810 and 820 denote non-chroma key regions (regions with a bit value "0"). A region other than these regions is a chroma key region (a region with a bit value "1").

Upon processing a line 830 in the right-eye mask image 800, the corresponding point detection unit 1103 refers to pixels which define the line 830 in turn from one side. Then, the corresponding point detection unit 1103 detects the start and end positions of a non-chroma key region (those of a pixel sequence in which pixels with a pixel value "0" are continuously arranged).

FIG. 8B shows the distribution of pixels which define the line 830. As shown in FIG. 8B, pixel groups which define non-chroma key regions are distributed at x=60 to 180 and 340 to 500. Therefore, as shown in FIG. 8C, on the line 830, the corresponding point detection unit 1103 registers "60" in the column of the start position, and "180" in the column of the corresponding end position, so as to indicate existence of a non-chroma key region at x=60 to 180. Likewise, the corresponding point detection unit 1103 registers "340" in the column of the start position, and "500" in the column of the corresponding end position, so as to indicate existence of another non-chroma key region at x=340 to 500.

In this way, the corresponding point detection unit 1103 registers sets of the start and end positions for respective non-chroma key regions. Since such table is generated for each line, if the number of lines of the right-eye mask image 800 is 480, 480 tables are generated. However, upon sequentially processing lines, only a table of the line which is being currently processed needs to be held, and the number of tables which are required in practice can be reduced.

Note that the start and end positions are registered in the form of a table in FIG. 8C. However, the data management format is not limited to this.

As described above, the corresponding point detection unit 1103 also executes the above processing for the left-eye mask image, and consequently generates a table shown in FIG. 8C for the left-eye mask image also. Note that each table generated for the right-eye mask image will be referred to as a right-eye table, and that generated for the left-eye mask image will be referred to as a left-eye table.

In this case, note that a non-chroma key region specified by the start and end positions registered in the m-th (m≧1) row in the right-eye table corresponds to that specified by the start and end positions registered in the m-th row in the left-eye table. The corresponding point detection unit 1103 outputs the start and end positions registered in the m-th row of the left-eye table to the left-eye slope detection unit 1104, and those registered in the m-th row of the right-eye table to the right-eye slope detection unit 1105.

A case will be described below wherein m=n.

Upon reception of the start and end position registered in the n-th row of the left-eye table, the left-eye slope detection unit 1104 calculates the slope of the boundary between the chroma key region and non-chroma key region at the start and end positions. Details of the processing executed by the left-eye slope detection unit 1104 will be described below with reference to FIG. 9.

Figure 9:
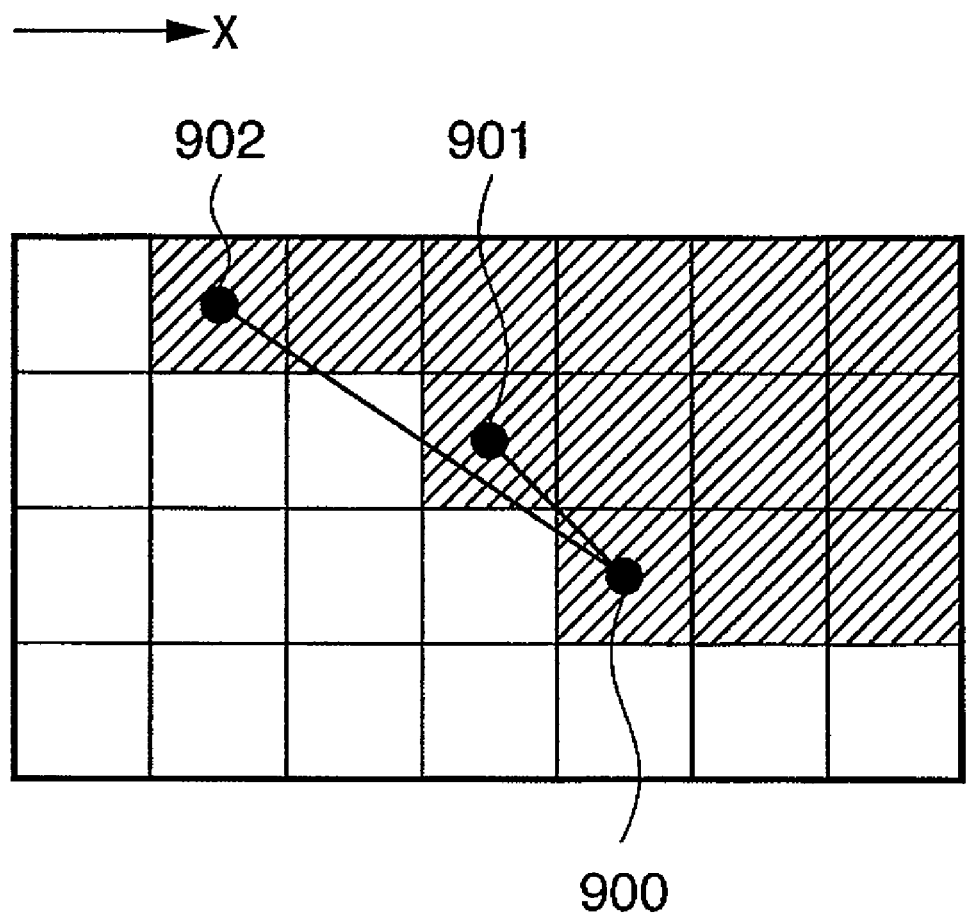
FIG. 9 is a view showing a method of obtaining a tangent on a contour.

FIG. 9 shows pixels which define a non-chroma key region (hatched portion) and those which define a chroma key region. Referring to FIG. 9, reference numeral 900 denotes a pixel position specified by the start position registered in the n-th row of the left-eye table. Reference numeral 901 denotes a pixel at a position immediately before a position with a referred pixel value "1", upon referring to pixel values from a position one line above, which has the same x-coordinate value as the pixel 900, in a direction to decrease the x-coordinate value. Reference numeral 902 denotes a pixel at a position immediately before a position with a referred pixel value "1", upon referring to pixel values from a position two lines above, which has the same x-coordinate value as the pixel 900, in the direction to decrease the x-coordinate value.

In order to calculate a slope at the position of the pixel 900, the left-eye slope detection unit 1104 calculates a slope of a straight line which passes through the position of the pixel 900 and that of the pixel 901, and also a slope of a straight line which passes through the position of the pixel 900 and that of the pixel 902. Then, the left-eye slope detection unit 1104 calculates the average values of these slopes, and defines the calculated average value as a slope at the position of the pixel 900. In this manner, the left-eye slope detection unit 1104 can calculate the slope at the start position.

The processing for calculating a slope at the end position will be described below. The left-eye slope detection unit 1104 specifies a pixel (pixel Q) at a position immediately before a position with a referred pixel value "1", upon referring to pixel values from a position one line above, which has the same x-coordinate value as a pixel (pixel P) specified by the end position registered in the n-th row of the left-eye table, in a direction to increase the x-coordinate value. Then, the left-eye slope detection unit 1104 specifies a pixel (pixel R) at a position immediately before a position with a referred pixel value "1", upon referring to pixel values from a position two line above, which has the same x-coordinate value as the pixel P, in the direction to increase the x-coordinate value. The left-eye slope detection unit 1104 calculates a slope of a straight line which passes through the position of the pixel P and that of the pixel Q, and also a slope of a straight line which passes through the position of the pixel P and that of the pixel R. The left-eye slope detection unit 1104 then calculates the average value of these slopes, and defines the calculated average value as a slope at the position of the pixel P.

A method of specifying two pixels obtained from the start position (e.g., the pixels 901 and 902 in FIG. 9) and those obtained from the end position (e.g., the pixels Q and R) will be described below with reference to FIGS. 10A and 10B.

Figure 10A:
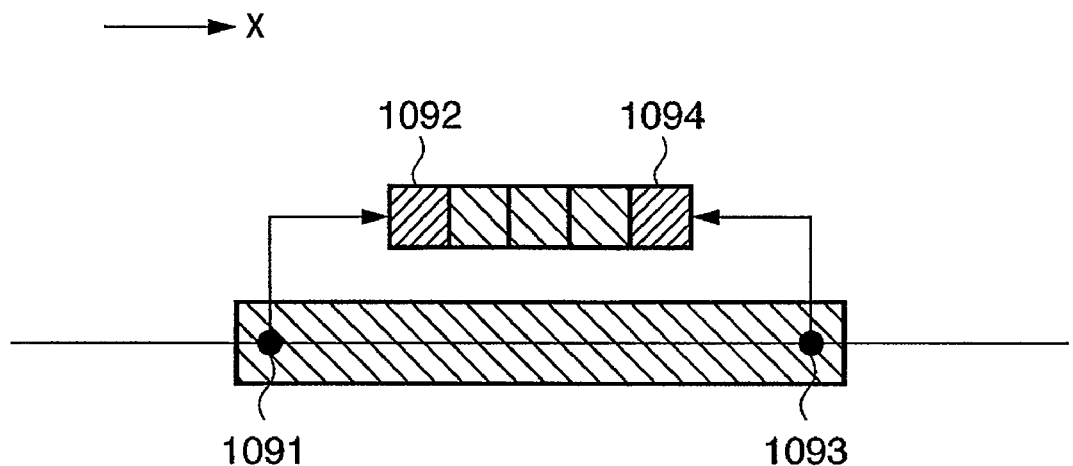
FIG. 10A is a view showing processing for searching for a non-chroma key region in the immediately preceding line toward the inner side of the non-chroma key region when positions immediately above the end points of a non-chroma key region do not belong to a non-chroma key region.

FIG. 10A shows a case in which both a position one line above, which has the same x-coordinate value as a pixel position specified by the start position registered in the n-th row of the left-eye table, and a position one line above, which the same x-coordinate value as a pixel position specified by the end position are within a chroma key region. In FIG. 10A, reference numeral 1091 denotes a pixel position specified by the start position registered in the n-th row of the left-eye table; and 1093, a pixel position specified by the end position registered in the n-th row of the left-eye table.

Figure 10B:
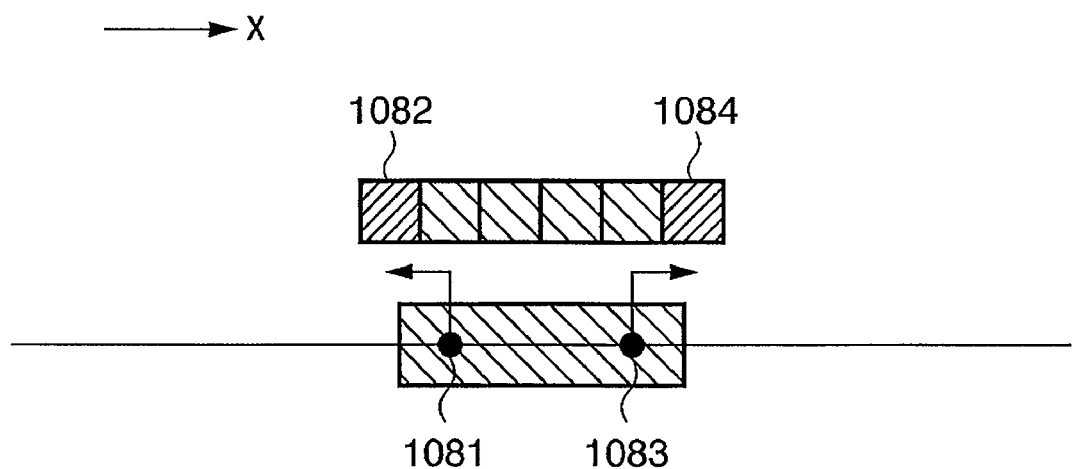
FIG. 10B is a view showing processing for searching for the end points of a non-chroma key region in the immediately preceding line toward the outer side of the non-chroma key region when positions immediately above the end points of the non-chroma key region belong to a non-chroma key region.

FIG. 10B shows a case in which both a position one line above, which has the same x-coordinate value as a pixel position specified by the start position registered in the n-th row of the left-eye table, and a position one line above, which the same x-coordinate value as a pixel position specified by the end position are within a non-chroma key region. In FIG. 10B, reference numeral 1081 denotes a pixel position specified by the start position registered in the n-th row of the left-eye table; and 1083, a pixel position specified by the end position registered in the n-th row of the left-eye table.

The left-eye slope detection unit 1104 checks if a pixel value of a pixel at a position one line above, which has the same x-coordinate value as a pixel position specified by the start position registered in the n-th row of the left-eye table in the left-eye mask image is "1" or "0". As a result of checking, if the pixel value is "1", i.e., if the pixel at the position one line above, which has the same x-coordinate value as a pixel position specified by the start position registered in the n-th row of the left-eye table, is included in a chroma key region, the left-eye slope detection unit 1104 executes the following processing. That is, as shown in FIG. 10A, the left-eye slope detection unit 1104 refers to pixel values from a position one line above, which has the same x-coordinate value as the pixel position 1091, in the direction to increase the x-coordinate value. Then, the left-eye slope detection unit 1104 specifies a pixel at a first position 1092 where the referred pixel value becomes "0" as "pixel S1". On the other hand, as a result of checking, if the pixel value is "0", i.e., if the pixel at the position one line above, which has the same x-coordinate value as a pixel position specified by the start position registered in the n-th row of the left-eye table, is included in a non-chroma key region, the left-eye slope detection unit 1104 executes the following processing. That is, as shown in FIG. 10B, the left-eye slope detection unit 1104 refers to pixel values from a position one line above, which has the same x-coordinate value as the pixel position 1081, in the direction to decrease the x-coordinate value. Then, the left-eye slope detection unit 1104 specifies a pixel at a position 1082 immediately before the referred pixel value becomes "1" as "pixel S1".

Next, the left-eye slope detection unit 1104 checks if a pixel value of a pixel at a position one line above, which has the same x-coordinate value as a pixel position specified by the end position registered in the n-th row of the left-eye table in the left-eye mask image is "1" or "0". As a result of checking, if the pixel value is "1", i.e., if the pixel at the position one line above, which has the same x-coordinate value as a pixel position specified by the end position registered in the n-th row of the left-eye table, is included in a chroma key region, the left-eye slope detection unit 1104 executes the following processing. That is, as shown in FIG. 10A, the left-eye slope detection unit 1104 specifies a pixel at a first position 1094 where a referred pixel value becomes "0" as "pixel E1" upon referring to pixel values from a position one line above, which has the same x-coordinate value as the pixel position 1093, in the direction to decrease the x-coordinate value. On the other hand, as a result of checking, if the pixel value is "0", i.e., if the pixel at the position one line above, which has the same x-coordinate value as a pixel position specified by the end position registered in the n-th row of the left-eye table, is included in a non-chroma key region, the left-eye slope detection unit 1104 executes the following processing. That is, as shown in FIG. 10B, the left-eye slope detection unit 1104 specifies a pixel at a position 1084 immediately before a referred pixel value becomes "1" as "pixel E1" upon referring to pixel values from a position one line above, which has the same x-coordinate value as the pixel position 1083, in the direction to increase the x-coordinate value.

Likewise, the left-eye slope detection unit 1104 refers to pixel values in a direction to decrease or increase the x-coordinate value depending on whether the pixel value of a pixel one line above, which has the same x-coordinate value as the pixel S1, is "1" or "0". Then, the left-eye slope detection unit 1104 similarly specifies a pixel S2. Also, the left-eye slope detection unit 1104 refers to pixel values in a direction to decrease or increase the x-coordinate value depending on whether the pixel value of a pixel one line above, which has the same x-coordinate value as the pixel E1, is "1" or "0". Then, the left-eye slope detection unit 1104 similarly specifies a pixel E2.

The left-eye slope detection unit 1104 then calculates a slope VSL1 of a straight line which passes through the pixel specified by the start position registered in the n-th row of the left-eye table, and the pixel S1. Furthermore, the left-eye slope detection unit 1104 calculates a slope VSL2 of a straight line which passes through the pixel specified by the start position registered in the n-th row of the left-eye table, and the pixel S2. Then, the left-eye slope detection unit 1104 calculates an average value VSL3 of the slopes VSL1 and VSL2 as a slope of the boundary between the chroma key region and non-chroma key region at the start position (position of interest) registered in the n-th row of the left-eye table.

Likewise, the left-eye slope detection unit 1104 then calculates a slope VEL1 of a straight line which passes through the pixel specified by the end position registered in the n-th row of the left-eye table, and the pixel E1. Furthermore, the left-eye slope detection unit 1104 calculates a slope VEL2 of a straight line which passes through the pixel specified by the end position registered in the n-th row of the left-eye table, and the pixel E2. Then, the left-eye slope detection unit 1104 calculates an average value VEL3 of the slopes VEL1 and VEL2 as a slope of the boundary between the chroma key region and non-chroma key region at the end position registered in the n-th row of the left-eye table.

The left-eye slope detection unit 1104 then outputs VSL1 to VSL3 and VEL1 to VEL3 to the error discrimination unit 1106.

The right-eye slope detection unit 1105 executes the same processing as in the left-eye slope detection unit 1104, and calculates slopes VSR1 to VSR3 corresponding to the slopes VSL1 to VSL3, and slopes VER1 to VER3 corresponding to the slopes VEL1 to VEL3 from the right-eye mask image. The right-eye slope detection unit 1105 outputs the calculated slopes VSR1 to VSR3 and slopes VER1 to VER3 to the error discrimination unit 1106.

The error discrimination unit 1106 checks if the difference between the slopes VSL3 and VSR3 is equal to or larger than a threshold (for example, 10° in this case). As a result of checking, if the difference is equal to or larger than 10°, the error discrimination unit 1106 determines that one of the right- and left-eye CG images includes an error part. On the other hand, if the difference between the slopes VSL3 and VSR3 is smaller than the threshold, the error discrimination unit 1106 determines that the neither the left-eye CG image nor the right-eye CG image include an error part.

Of course, the criterion for checking whether or not one of the right- and left-eye CG images includes an error part is not limited to such specific criterion, and various other criteria may be used. When other criteria are used, information to be calculated for such criteria needs to be calculated as needed.

The error discrimination unit 1106 outputs VSL1 to VSL3 and VSR1 to VSR3 to the correction part discrimination unit 1107 together with flag information indicating whether or not one of the right- and left-eye CG images includes an error part.

The correction part discrimination unit 1107 checks with reference to this flag information which of the right- and left-eye CG images includes an error part. In this embodiment, when the boundary between the chroma key region and non-chroma key region is considered as a curve (including a straight line), it is determined that an image having a smooth curve shape is free from any error part. Of course, such criterion is only an example, and other criteria may be used.

The correction part discrimination unit 1107 according to this embodiment refers to the flag value received from the error discrimination unit 1106. If this flag value indicates that "no error part is included", the correction part discrimination unit 1107 does not execute any processing.

On the other hand, if the flag value received from the error discrimination unit 1106 indicates that "an error part is included", the correction part discrimination unit 1107 calculates an angle the slopes VSL1 and VSL2 make, and also an angle the slopes VSR1 and VSR2 make. The correction part discrimination unit 1107 determines that the mask image with a larger one of the calculated angles includes an error part. As a result, if the correction part discrimination unit 1107 determines that the left-eye mask image includes an error part, it outputs the slope VSR1 (or VSR2) to the left-eye mask correction unit 1108. On the other hand, if the correction part discrimination unit 1107 determines that the right-eye mask image includes an error part, it outputs the slope VSL1 (or VSL2) to the right-eye mask correction unit 1110.

Upon reception of the slope VSR1 from the correction part discrimination unit 1107, the left-eye mask correction unit 1108 specifies a pixel (correction start pixel), through which a straight line that passes through the pixel S1 and has the slope VSR1 passes, of a pixel group on a line immediately below the line of the pixel S1. When the x-coordinate value of the correction start pixel is smaller than that of the start position registered in the n-th row of the left-eye table, the left-eye mask correction unit 1108 sets the pixel values of the correction start pixel, and of those between the correction start pixel and the pixel of the start position registered in the n-th row of the left-eye table, to be "0". On the other hand, when the x-coordinate value of the correction start pixel is larger than that of the start position registered in the n-th row of the left-eye table, the left-eye mask correction unit 1108 sets the pixel values of the pixel of the start position registered in the n-th row of the left-eye table, and of those between this pixel and the correction start pixel, to be "1".

FIG. 11 is a view for explaining the processing for correcting a line of the start position registered in the n-th row of the left-eye table. Referring to FIG. 11, reference numeral 1192 denotes a pixel S1; and 1199, a pixel specified by the start position registered in the n-th row of the left-eye table. Reference numeral 1198 denotes a correction start pixel. As described above, a pixel, through which a straight line that passes through the pixel 1192 and has the slope VSR1 passes, of those which define the line of the start position registered in the n-th row of the left-eye table, is the correction start pixel 1198. Therefore, in this case, the left-eye mask correction unit 1108 sets the pixel values of pixels between the correction start pixel 1198 and a pixel 1199 (including the correction start pixel 1198) to be "0".

The error discrimination unit 1106 checks if the difference between the slopes VEL3 and VER3 is equal to or larger than 10°. As a result of checking, if the difference is equal to or larger than 10°, the error discrimination unit 1106 determines that one of the right- and left-eye CG images includes an error part. Of course, the criterion for checking whether or not one of the right- and left-eye CG images includes an error part is not limited to such a specific criterion, and various other criteria may be used. When other criteria are used, information to be calculated for such criteria needs to be calculated.

The error discrimination unit 1106 outputs VEL1 to VEL3 and VER1 to VER3 to the correction part discrimination unit 1107 together with flag information indicating whether or not one of the right- and left-eye CG images includes an error part.

The correction part discrimination unit 1107 checks which of the right- and left-eye CG images includes an error part. In this embodiment, when the boundary between the chroma key region and non-chroma key region is considered as a curve (including a straight line), it is determined that an image having a smooth curve shape is free from any error part. Of course, such criterion is an example, and other criteria may be used.

The correction part discrimination unit 1107 according to this embodiment refers to the flag value received from the error discrimination unit 1106. If this flag value indicates that "no error part is included", the correction part discrimination unit 1107 does not execute any processing.

On the other hand, if the flag value received from the error discrimination unit 1106 indicates that "an error part is included", the correction part discrimination unit 1107 calculates an angle the slopes VEL1 and VEL2 make, and also an angle the slopes VER1 and VER2 make. The correction part discrimination unit 1107 determines that the mask image with a larger one of the calculated angles includes an error part. As a result, if the correction part discrimination unit 1107 determines that the left-eye mask image includes an error part, it outputs the slope VER1 (or VER2) to the left-eye mask correction unit 1108. On the other hand, if the correction part discrimination unit 1107 determines that the right-eye mask image includes an error part, it outputs the slope VEL1 (or VEL2) to the right-eye mask correction unit 1110.

Upon reception of the slope VER1 from the correction part discrimination unit 1107, the left-eye mask correction unit 1108 specifies a pixel (correction start pixel), through which a straight line that passes through the pixel E1 and has the slope VER1 passes, of a pixel group on a line immediately below the line of the pixel E1.

When the x-coordinate value of the correction start pixel is smaller than that of the end position registered in the n-th row of the left-eye table, the left-eye mask correction unit 1108 sets the pixel values of the pixel of the end position registered in the n-th row of the left-eye table and of those between this pixel and the correction start pixel, to be "1". On the other hand, when the x-coordinate value of the correction start pixel is larger than that of the end position registered in the n-th row of the left-eye table, the left-eye mask correction unit 1108 sets the pixel values of the correction start pixel, and of those between the correction start pixel and the pixel of the end position registered in the n-th row of the left-eye table, to be "0".

The right-eye mask correction unit 1110 executes basically the same processing as in the left-mask correction unit 1108, except for the different slopes to be used.

With the aforementioned processing, since an error part in the mask image can be corrected, no error part is generated in the composition result even when the chroma key composition processing is executed using this mask image, as described above.

Upon completion of the aforementioned processing for all the rows of the right- and left-eye tables, the same processing is repeated for the next line.

In this embodiment, only the mask image is corrected. However, it is preferable to also correct the CG image in the process of this correction. For example, when pixels whose pixel values are corrected in the left-eye mask image are included in a non-chroma key region as a result of this correction, the pixel values of pixels in the right-eye CG image corresponding to pixels (left pixels) in the left-eye CG image, which correspond to those pixels, are copied to the pixel values of the left pixels.

Figure 21:
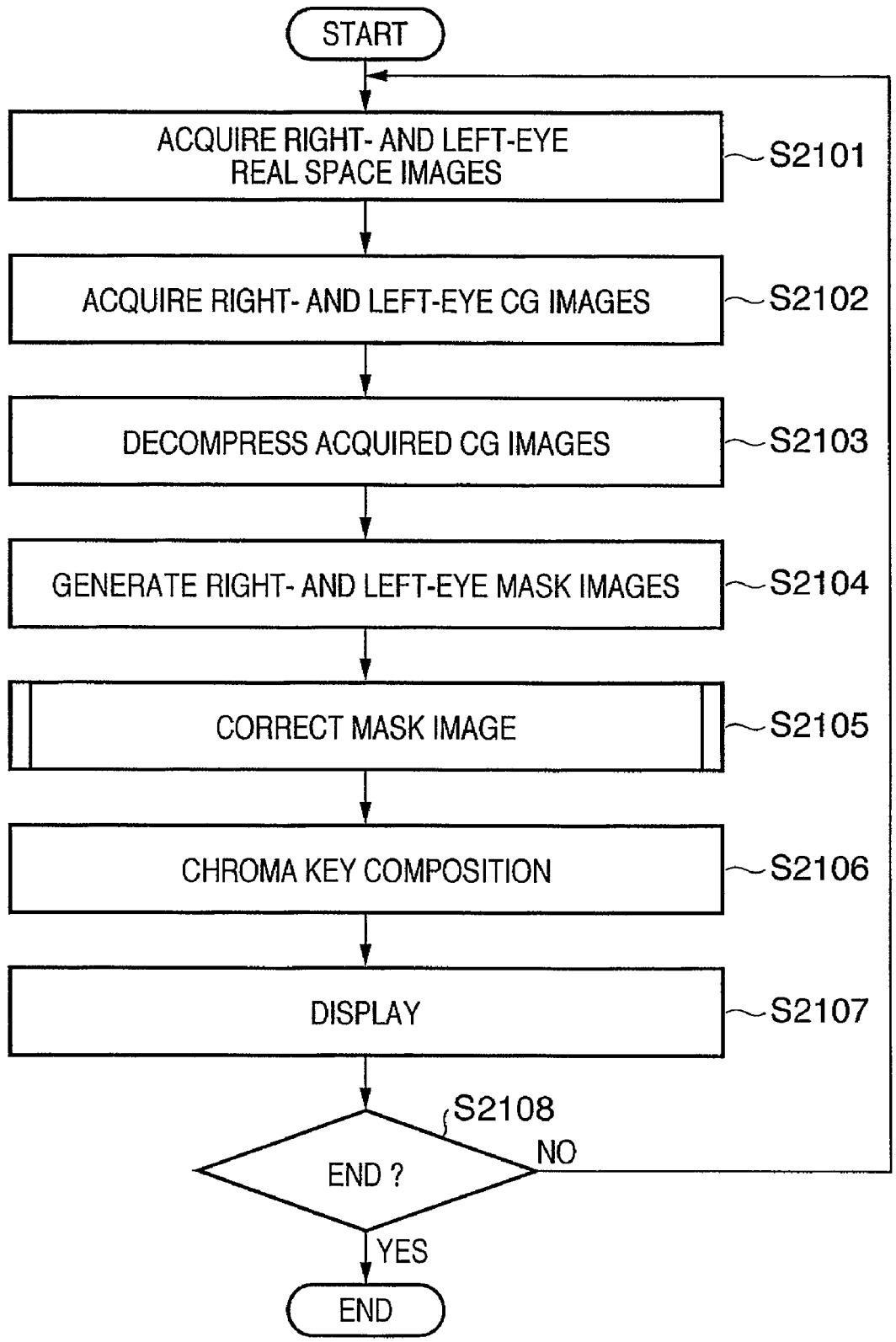
FIG. 21 is a flowchart of the main processing executed when the HMD 1000 presents images obtained by chroma-key compositing real space images and CG images to the right and left eyes of a user 2000.

FIG. 21 is a flowchart of the main processing executed when the HMD 1000 presents images obtained by chroma-key compositing the real space images and CG images to the right and left eyes of the user 2000.

In step S2101, the right- and left-eye image switching units 1111 and 1109 respectively acquire right- and left-eye real space images output from the right- and left-eye cameras 1002 and 1001.

In step S2102, the wireless image reception unit 1011 receives (acquires) compressed right- and left-eye CG images.

In step S2103, the right-eye decompression unit 1013 decompresses the compressed right-eye CG image, and the left-eye decompression unit 1012 decompresses the compressed left-eye CG image.

In step S2104, the left-eye color discrimination unit 1101 generates a left-eye mask image, and the right-eye color discrimination unit 1102 generates a right-eye mask image.

In step S2105, a series of processes associated with correction of the mask images are executed. Details of the processing in step S2105 will be described later.

In step S2106, the right-eye image switching unit 1111 executes chroma key composition of the right-eye real space image acquired in step S2101 and the right-eye CG image decompressed in step S2103 using the right-eye mask image. This right-eye mask image is the one which may or may not be corrected by the right-eye mask correction unit 1110. Furthermore, in step S2106 the left-eye image switching unit 1109 executes chroma key composition of the left-eye real space image acquired in step S2101 and the left-eye CG image decompressed in step S2103 using the left-eye mask image. This left-eye mask image is the one which may or may not be corrected by the left-eye mask correction unit 1108.

In step S2107, the left-eye image switching unit 1109 outputs a composite image after the chroma key composition to the left-eye LCD 1003, thus displaying this composite image on the left-eye LCD 1003. Furthermore, in step S2107 the right-eye image switching unit 1111 outputs a composite image after the chroma key composition to the right-eye LCD 1004, thus displaying this composite image on the right-eye LCD 1004.

The process returns to step S2101 via step S2108 unless the end condition of this processing is satisfied, and the subsequent processes are repeated for the next frame.

Figure 22:
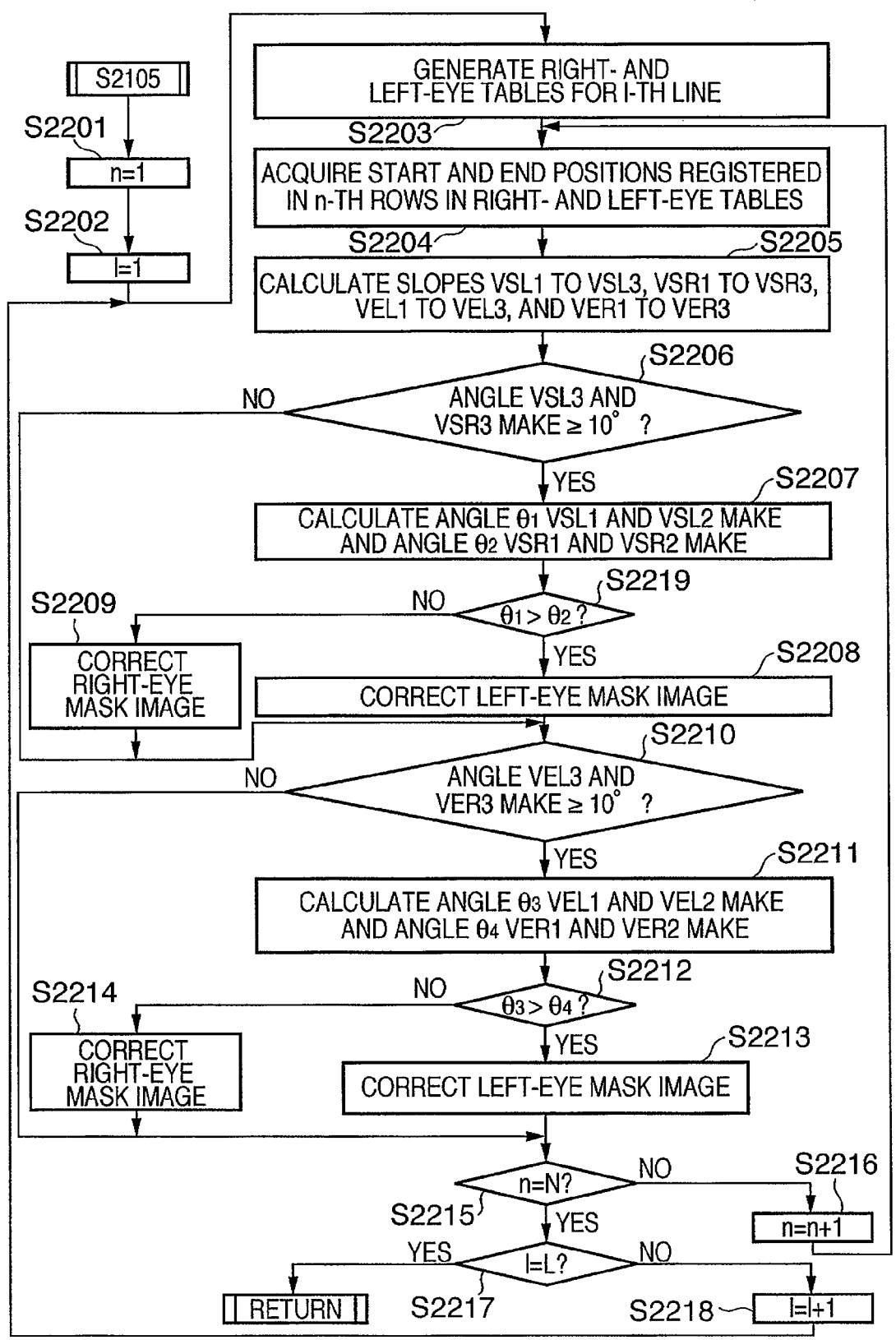
FIG. 22 is a flowchart showing details of the processing in step S2105.

FIG. 22 is a flowchart showing details of the processing in step S2105. Since details of the processing according to the flowchart of FIG. 22 have been described above, a brief explanation will be given below.

In step S2201, a variable n used in the following processing is set to be "1". Since this variable n is used to indicate a row to be processed in each of right- and left-eye tables, the corresponding point detection unit 1103 preferably executes the processing in step S2201. However, the main body of the processing in this step is not limited to the corresponding point detection unit 1103.

In step S2202, a variable 1 used in the following processing is set to be "1". Since this variable 1 is used to indicate a line to be processed of those which form right- and left-eye mask images, the corresponding point detection unit 1103 preferably executes the processing in step S2202. However, the main body of the processing in this step is not limited to the corresponding point detection unit 1103.

In step S2203, the corresponding point detection unit 1103 generates a left-eye table for the l-th line of the left-eye mask image, and also a right-eye table for the l-th line of the right-eye mask image.

In step S2204, the corresponding point detection unit 1103 acquires the start and end positions registered in the n-th rows in the right- and left-eye tables. The corresponding point detection unit 1103 outputs the start and end positions acquired from the right-eye table to the right-eye slope detection unit 1105, and those acquired from the left-eye table to the left-eye slope detection unit 1104.

In step S2205, the left-eye slope detection unit 1104 executes the aforementioned processing to calculate slopes VSL1 to VSL3 and VEL1 to VEL3. The left-eye slope detection unit 1104 outputs the calculated slopes VSL1 to VSL3 and VEL1 to VEL3 to the error discrimination unit 1106. Furthermore, in this step the right-eye slope detection unit 1105 executes the aforementioned processing to calculate slopes VSR1 to VSR3 and VER1 to VER3. The right-eye slope detection unit 1105 outputs the calculated slopes VSR1 to VSR3 and VER1 to VER3 to the error discrimination unit 1106.

The error discrimination unit 1106 checks in step S2206 if the difference between the slopes VSL3 and VSR3 is equal to or larger than 10°. As a result of checking, if the difference is equal to or larger than 10°, the error discrimination unit 1106 outputs VSL1 to VSL3 and VSR1 to VSR3 to the correction part discrimination unit 1107 together with flag information indicating whether or not one of the right- and left-eye CG images includes an error part. The process then advances to step S2207. On the other hand, if the difference is less than 10°, the process jumps to step S2210.

In step S2207, the correction part discrimination unit 1107 calculates an angle θ1 the slopes VSL1 and VSL2 make, and also an angle θ2 the slopes VSR1 and VSR2 make.

In step S2219, the correction part discrimination unit 1107 compares θ1 and θ2. If θ1>θ2, the correction part discrimination unit 1107 outputs the slope VSR1 (or VSR2) to the left-eye mask correction unit 1108. The process advances to step S2208. On the other hand, if θ1≦θ2, the correction part discrimination unit 1107 outputs the slope VSL1 (or VSL2) to the right-eye mask correction unit 1110. The process then advances to step S2209.

In step S2208, the left-eye mask correction unit 1108 specifies a pixel (correction start pixel), through which a straight line that passes through the pixel S1 and has the slope VSR1 passes, of a pixel group on a line immediately below the line of the pixel S1. If the x-coordinate value of the correction start pixel is smaller than that of the start position registered in the n-th row of the left-eye table, the left-eye mask correction unit 1108 sets the pixel values of the correction start pixel, and of those between the correction start pixel and the pixel of the start position registered in the n-th row of the left-eye table, to be "0". On the other hand, if the x-coordinate value of the correction start pixel is larger than that of the start position registered in the n-th row of the left-eye table, the left-eye mask correction unit 1108 sets the pixel values of the pixel of the start position registered in the n-th row of the left-eye table, and of those between this pixel and the correction start pixel, to be "1". In this way, the left-eye mask image is corrected in step S2208.

On the other hand, in step S2209, the right-eye mask correction unit 1110 executes basically the same processing as in the left-mask correction unit 1108 except for the different slopes to be used. In this way, the right-eye mask image is corrected.

The error discrimination unit 1106 checks in step S2210 if the difference between the slopes VEL3 and VER3 is equal to or larger than 10°. As a result of checking, if the difference is equal to or larger than 10°, the error discrimination unit 1106 outputs VEL1 to VEL3 and VER1 to VER3 to the correction part discrimination unit 1107 together with flag information indicating whether or not one of the right- and left-eye CG images includes an error part. The process then advances to step S2211. On the other hand, if the difference is less than 10°, the process jumps to step S2215.

In step S2211, the correction part discrimination unit 1107 calculates an angle θ3 the slopes VEL1 and VEL2 make, and also an angle θ4 the slopes VER1 and VER2 make.

In step S2212, the correction part discrimination unit 1107 compares θ3 and θ4. If θ3>θ4, the correction part discrimination unit 1107 outputs the slope VER1 (or VER2) to the left-eye mask correction unit 1108. The process then advances to step S2213. On the other hand, if θ3≦θ4, correction part discrimination unit 1107 outputs the slope VEL1 (or VEL2) to the right-eye mask correction unit 1110. The process then advances to step S2214.

In step S2213, the left-eye mask correction unit 1108 specifies a pixel (correction start pixel), through which a straight line that passes through the pixel E1 and has the slope VER1 passes, of a pixel group on a line immediately below the line of the pixel E1. If the x-coordinate value of the correction start pixel is smaller than that of the end position registered in the n-th row of the left-eye table, the left-eye mask correction unit 1108 sets the pixel values of the pixel of the end position registered in the n-th row of the left-eye table and of those between this pixel and the correction start pixel, to be "1". On the other hand, if the x-coordinate value of the correction start pixel is larger than that of the end position registered in the n-th row of the left-eye table, the left-eye mask correction unit 1108 sets the pixel values of the correction start pixel, and of those between the correction start pixel and the pixel of the end position registered in the n-th row of the left-eye table, to be "0". In this manner, the left-eye mask image is corrected in step S2213.

In step S2214, the right-eye mask correction unit 1110 executes basically the same processing as in the left-eye mask correction unit 1108 except for the different slopes to be used. In this way, the right-eye mask image is corrected.

The corresponding point detection unit 1103 checks in step S2215 if n=N (N is the total number of rows in each of the right- and left-eye tables), i.e., if the processes in step S2204 and subsequent steps are complete for all the rows in the right- and left-eye tables. As a result of checking, if n=N, the process advances to step S2217. On the other hand, if n<N, the process advances to step S2216.

In step S2216, the corresponding point detection unit 1103 increments the value of the variable n by one. Then, the processes in steps S2204 and subsequent steps are repeated.

On the other hand, the corresponding point detection unit 1103 checks in step S2217 if l=L (L is the total number of lines of each of the right- and left-eye mask images), i.e., if the processes in step S2203 and subsequent steps are complete for all the lines of the right- and left-eye images. As a result of checking, if l=L, the processing according to the flowchart shown in FIG. 22 ends, and the control returns to step S2106. On the other hand, if l<L, the process advances to step S2218.

In step S2218, the corresponding point detection unit 1103 increments the value of the variable l by one. Then, the processes in step S2203 and subsequent steps are repeated.

As described above, according to this embodiment, using the similarity between the right and left CG images, even when one CG image includes an error part, the boundary between the chroma key region and non-chroma key region is correctly detected, and the chroma key color required for the chroma key composition can be satisfactorily detected.

Note that this embodiment implements correction of the chroma key composition by correcting mask images. However, the correction of the chroma key composition need not always be implemented by correcting the mask images. That is, by correcting the CG images including an error part or images obtained as a result of the chroma key composition, the chroma key composition can be implemented by correcting losses from the CG images including an error part.

Even in the method of directly correcting CG images or the method of correcting images obtained as a result of the chroma key composition, this embodiment can be similarly applied, and can implement the chroma key composition by correcting an error part.

Second Embodiment

This embodiment corrects an error part using the disparity between right- and left-eye CG images. Note that various criteria to be described in this embodiment are examples, and can be modified as needed by those who are skilled in the art.

FIG. 12 is a view for explaining the disparity between a right-eye CG image and left-eye mask image. In FIG. 12, reference numeral 12010 denotes a left-eye mask image; and 12020, a right-eye mask image. These mark images include non-chroma key regions 1298 and 1299, and their positions in the mask images are slightly different due to parallax. This difference corresponds to the disparity. Reference numeral 12030 denotes an image obtained when the right- and left-eye mask images 12020 and 12010 overlap each other. As shown in this image 12030, the positions of the non-chroma key regions 1299 and 1298 in the right- and left-eye mask images 1220 and 12010 are slightly different.

In this embodiment, whether or not an error part is included is checked by detecting, for each line, a positional difference between a boundary between a chroma key region and non-chroma key region in the right-eye mask image, and a boundary corresponding to this boundary in the left-eye mask image.

Figure 14:
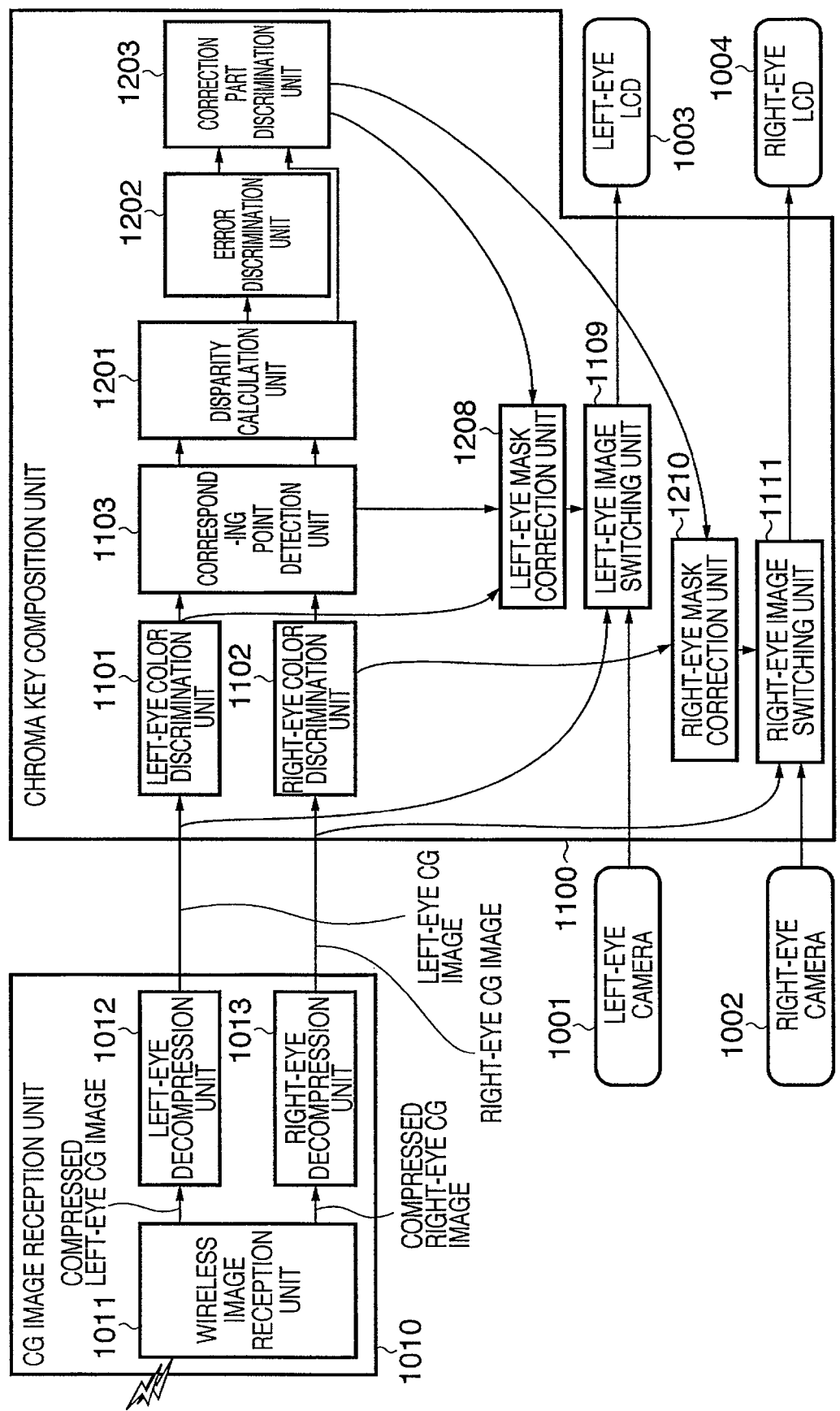
FIG. 14 is a block diagram showing the functional arrangement of an HMD 1000 according to the fourth embodiment.

FIG. 14 is a block diagram showing the functional arrangement of an HMD 1000 according to this embodiment. Note that the same reference numerals in FIG. 14 denote the same parts as those in FIG. 4, and repetitive description will be omitted.

A disparity calculation unit 1201 receives the start and end positions registered in the n-th row of a left-eye table, and those registered in the n-th row of a right-eye table from a corresponding point detection unit 1103.

Then, the disparity calculation unit 1201 calculates, as a "disparity DSi", a value (positional difference) by subtracting the start position registered in the n-th row of the right-eye table from that registered in the n-th row of the left-eye table. Also, the disparity calculation unit 1201 calculates pixels S2 and S1 in the right- and left-eye mask images by executing the processing described in the first embodiment. Then, the disparity calculation unit 1201 calculates, as a "disparity DS(i−1)", a value by subtracting the position of the pixel S1 in the right-eye mask image from that of the pixel S1 in the left-eye mask image. Furthermore, the disparity calculation unit 1201 calculates, as a "disparity DS(i−2)", a value by subtracting the position of the pixel S2 in the right-eye mask image from that of the pixel S2 in the left-eye mask image.

Also, the disparity calculation unit 1201 calculates, as a "disparity DEi", a value by subtracting the end position registered in the n-th row of the right-eye table from that registered in the n-th row of the left-eye table. Also, the disparity calculation unit 1201 calculates pixels E2 and E1 in the right- and left-eye mask images by executing the processing described in the first embodiment. Then, the disparity calculation unit 1201 calculates, as a "disparity DE(i−1)", a value by subtracting the position of the pixel E1 in the right-eye mask image from that of the pixel E1 in the left-eye mask image. Furthermore, the disparity calculation unit 1201 calculates, as a "disparity DE(i−2)", a value by subtracting the position of the pixel E2 in the right-eye mask image from that of the pixel E2 in the left-eye mask image.

The disparity calculation unit 1201 outputs the calculated data of DSi, DS(i−1), DS(i−2), DEi, DE(i−1), and DE(i−2) to a subsequent error discrimination unit 1202.

The disparity calculation unit 1201 executes processing which is described in the first embodiment as that to be executed by the right- and left-eye slope detection units 1105 and 1104. That is, the disparity calculation unit 1201 calculates slopes VSL1 to VSL3, VEL1 to VEL3, VSR1 to VSR3, and VER1 to VER3. The disparity calculation unit 1201 outputs these calculated slopes to a correction part discrimination unit 1203.

The error discrimination unit 1202 checks based on the received disparity data if one of the right- and left-eye CG images includes an error part.

Figure 13:
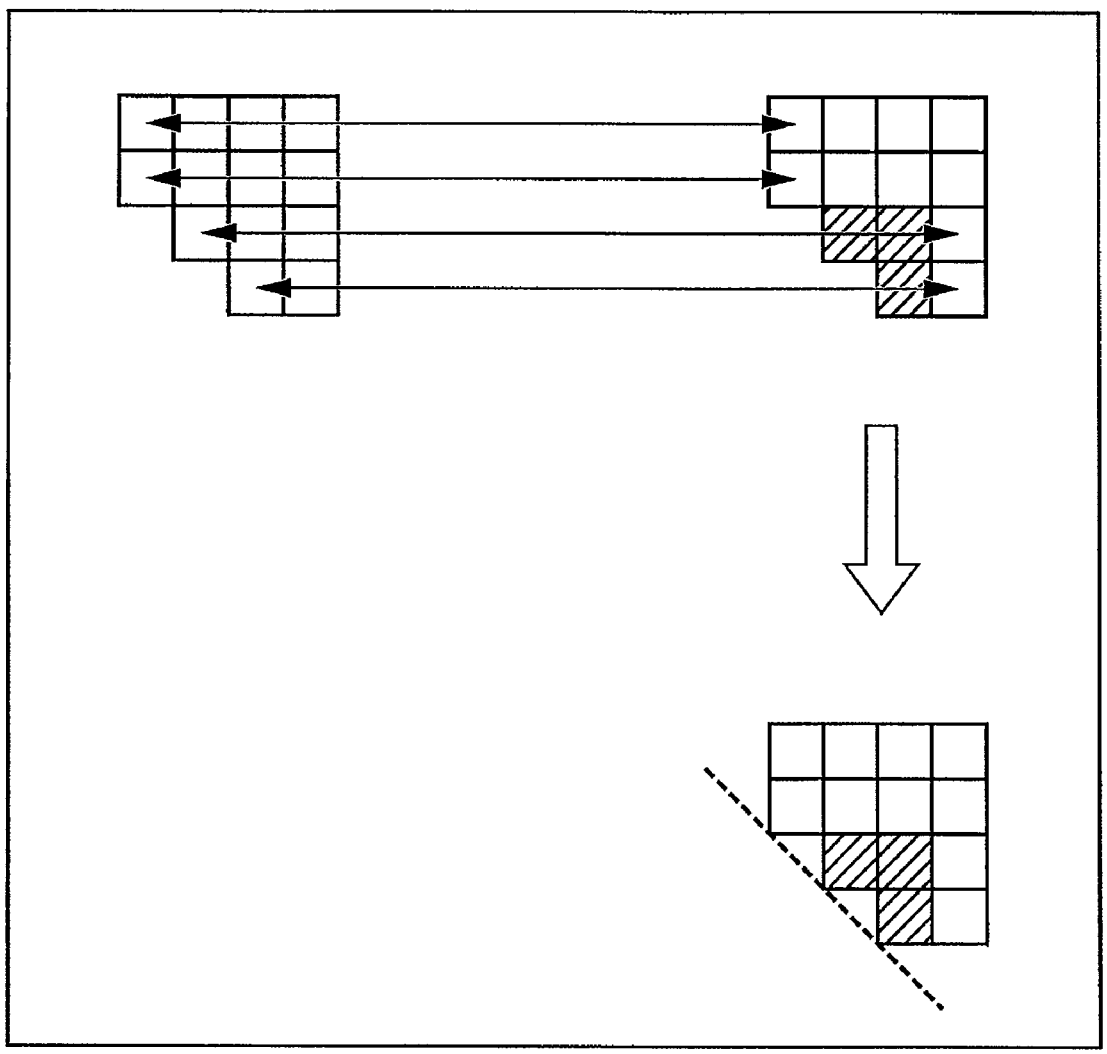
FIG. 13 is a view for explaining processing for correcting a mask image based on the disparity.

This embodiment is based on the precondition that the disparities for respective lines change smoothly in the right- and left-eye CG images, as shown in FIG. 13. If a disparity changes abruptly in a certain line, it is determined that this line includes an error part. FIG. 13 is a view for explaining processing for correcting mask images based on a disparity.

More specifically, the error discrimination unit 1202 calculates a difference x between DSi and DS(i−1), and a difference y between DS(i−1) and DS(i−2), and checks if the absolute value of a difference (change amount) between the differences x and y is equal to or larger than 10. If this absolute value is equal to or larger than 10, the error discrimination unit 1202 determines that one of the right- and left-eye CG images includes an error part.

The error discrimination unit 1202 generates flag information indicating the determination result as to whether or not an error part is included, and outputs the correction part discrimination unit 1203.

The correction part discrimination unit 1203 refers to the flag information from the error discrimination unit 1202. If this flag information indicates that "one of the right- and left-eye CG images includes an error part", the correction part discrimination unit 1203 checks which of the CG images includes an error part. The correction part discrimination unit 1203 executes this checking processing as in the first embodiment. Therefore, the correction part discrimination unit 1203 executes the same processing as that executed by the correction part discrimination unit 1107 using the data of VSL1 to VSL3 and VSR1 to VSR3 received from the disparity calculation unit 1201.

When the correction part discrimination unit 1203 determines that the left-eye mask image includes an error part, it acquires the data of DS(i−1) and DS(i−2) from the disparity calculation unit 1201. The correction part discrimination unit 1203 calculates 2×DS(i−1)−DS(i−2) using the acquired data, and outputs the calculated value to a left-eye mask correction unit 1208 as corrected disparity data. On the other hand, when the correction part discrimination unit 1203 determines that the right-eye mask image includes an error part, it calculates a value of 2×DS(i−1)−DS(i−2) to a right-eye mask correction unit 1210 as corrected disparity data.

The left-eye mask correction unit 1208 acquires a start position (p) registered in the n-th row of the right-eye table from the corresponding point detection unit 1103, and specifies a correction start pixel at the position of p+2×DS(i−1)−DS(i−2) on the left-eye mask image. When the x-coordinate value of the correction start pixel is smaller than that of the start position registered in the n-th row of the left-eye table, the left-eye mask correction unit 1208 sets the pixel values of the correction start pixel, and of those between the correction start pixel and the pixel of the start position registered in the n-th row of the left-eye table, to be "0". On the other hand, when the x-coordinate value of the correction start pixel is larger than that of the start position registered in the n-th row of the left-eye table, the left-eye mask correction unit 1208 sets the pixel values of the pixel of the start position registered in the n-th row of the left-eye table, and of those between this pixel and the correction start pixel, to be "1".

The right-eye mask correction unit 1210 acquires a start position (p) registered in the n-th row of the left-eye table from the corresponding point detection unit 1103, and specifies a correction start pixel at the position of p−2×DS(i−1)+DS(i−2) on the left-eye mask image. When the x-coordinate value of the correction start pixel is smaller than that of the start position registered in the n-th row of the right-eye table, the right-eye mask correction unit 1210 sets the pixel values of the correction start pixel, and of those between the correction start pixel and the pixel of the start position registered in the n-th row of the right-eye table, to be "0". On the other hand, when the x-coordinate value of the correction start pixel is larger than that of the start position registered in the n-th row of the right-eye table, the right-eye mask correction unit 1210 sets the pixel values of the pixel of the start position registered in the n-th row of the right-eye table, and of those between this pixel and the correction start pixel, to be "1".

Also, the error discrimination unit 1202 calculates a difference x between DEi and DE(i−1), and a difference y between DE(i−1) and DE(i−2), and checks if the absolute value of a difference between the differences x and y is equal to or larger than 10. If this absolute value is equal to or larger than 10, the error discrimination unit 1202 determines that one of the right- and left-eye CG images includes an error part.

The error discrimination unit 1202 generates flag information indicating the determination result as to whether or not an error part is included, and outputs the correction part discrimination unit 1203.

The correction part discrimination unit 1203 refers to the flag information from the error discrimination unit 1202. If this flag information indicates that "one of the right- and left-eye CG images includes an error part", the correction part discrimination unit 1203 checks which of the CG images includes an error part. The correction part discrimination unit 1203 executes this checking processing as in the first embodiment. Therefore, the correction part discrimination unit 1203 executes the same processing as that executed by the correction part discrimination unit 1107 using the data of VEL1 to VEL3 and VER1 to VER3 received from the disparity calculation unit 1201.

When the correction part discrimination unit 1203 determines that the left-eye mask image includes an error part, it acquires the data of DE(i−1) and DE(i−2) from the disparity calculation unit 1201. The correction part discrimination unit 1203 calculates 2×DE(i−1)−DE(i−2) using the acquired data, and outputs the calculated value to the left-eye mask correction unit 1208 as corrected disparity data. On the other hand, when the correction part discrimination unit 1203 determines that the right-eye mask image includes an error part, it calculates a value of 2×DE(i−1)−DE(i−2) to the right-eye mask correction unit 1210 as corrected disparity data.

Figure 15:
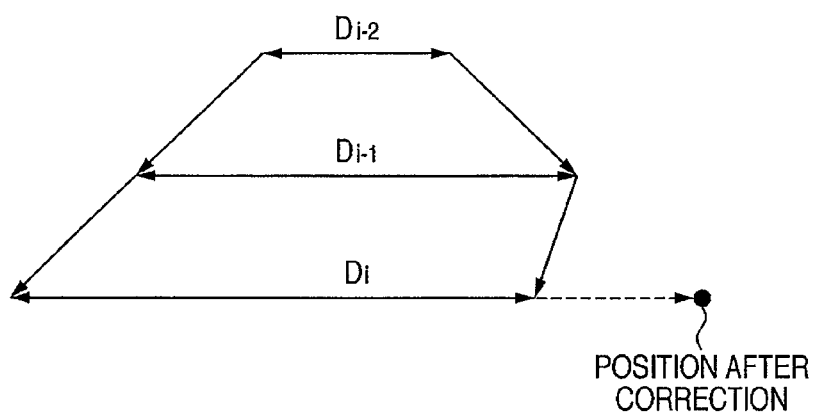
FIG. 15 is a view for explaining correction processing of a mask image.

The left-eye mask correction unit 1208 acquires an end position (q) registered in the n-th row of the right-eye table from the corresponding point detection unit 1103, and specifies a correction start pixel at the position of q+2×DE(i−1)−DE(i−2) on the left-eye mask image, as shown in FIG. 15. When the x-coordinate value of the correction start pixel is smaller than that of the end position registered in the n-th row of the left-eye table, the left-eye mask correction unit 1208 sets the pixel values of the pixel of the end position registered in the n-th row of the left-eye table and of those between this pixel and the correction start pixel, to be "1". On the other hand, when the x-coordinate value of the correction start pixel is larger than that of the end position registered in the n-th row of the left-eye table, the left-eye mask correction unit 1208 sets the pixel values of the correction start pixel, and of those between the correction start pixel and the pixel of the end position registered in the n-th row of the left-eye table, to be "0".

On the other hand, the right-eye mask correction unit 1210 acquires an end position (q) registered in the n-th row of the left-eye table from the corresponding point detection unit 1103, and specifies a correction start pixel at the position of q−2×DE(i−1)+DE(i−2) on the right-eye mask image. When the x-coordinate value of the correction start pixel is smaller than that of the end position registered in the n-th row of the right-eye table, the right-eye mask correction unit 1210 sets the pixel values of the pixel of the end position registered in the n-th row of the right-eye table and of those between this pixel and the correction start pixel, to be "1". On the other hand, when the x-coordinate value of the correction start pixel is larger than that of the end position registered in the n-th row of the right-eye table, the right-eye mask correction unit 1210 sets the pixel values of the correction start pixel, and of those between the correction start pixel and the pixel of the end position registered in the n-th row of the right-eye table, to be "0".

In this way, the right- and left-eye mask images are corrected.

The subsequent processes are the same as those in the first embodiment.

In the first embodiment, the slopes of the contours of the right and left images are compared to find losses, and these losses are corrected upon execution of chroma key composition. When right and left images having a small disparity are similar to each other, the method of the first embodiment works satisfactorily. However, when right and left images having a relatively large disparity are relatively different from each other, the method of the first embodiment does not always normally work.

Since this embodiment uses the continuity of disparities, even when right and left contours look different (for example, when an object is present in front of one eye), correction can be done to some extent. In this regard, this embodiment exhibits characteristics superior to the first embodiment.

However, when objects overlap each other, discontinuity of disparities occurs, and this embodiment does not always work. This embodiment is not suited to handling such images.

This embodiment implements correction of the chroma key composition by correcting mask images. However, the correction of the chroma key composition need not always be implemented by correcting the mask images.

By correcting the CG images with losses or images obtained as a result of the chroma key composition, the chroma key composition can be implemented by correcting losses from the input images with losses.

Even in the method of directly correcting CG images or the method of correcting images obtained as a result of the chroma key composition, this embodiment can be similarly applied, and can implement the chroma key composition by correcting losses.

Third Embodiment

In this embodiment, using left-eye CG images of respective frames, an error part in a left-eye CG image of the frame of interest is corrected. Likewise, using right-eye CG images of respective frames, an error part in a right-eye CG image of the frame of interest is corrected.

Figure 16:
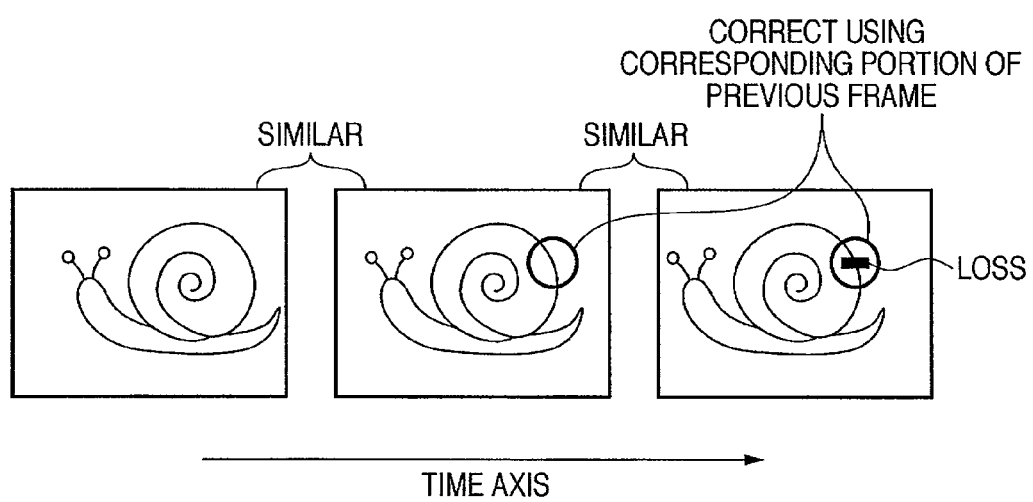
FIG. 16 is a view for explaining similarities between images of neighboring frames.

In this embodiment, based on the precondition that images of successive (continuous) frames are relatively similar to each other, as shown in FIG. 16, it is determined that an image of the frame of interest in which a part largely different from an image of the previous frame includes an error part. Then, a mask image corresponding to the image of the frame of interest is corrected.

In the first and second embodiments, since the presence/absence of an error part is determined using similarities of stereoscopic images, when a nearby object is captured, a largely different part may appear in an image for the right eye, and that for the left eye. Therefore, in such case, satisfactory correction is disturbed.

This embodiment is free from such restrictions since the presence/absence of an error part is determined using images of successive frames. Even when a nearby object is captured, chroma key composition can be implemented by correcting losses of input images without posing any problem.

However, images of successive frames are expected to have similarities when the cameras do not make large movements. When the positions and orientations of the cameras are changed, this embodiment cannot always obtain the results better than the correction using similarities of stereoscopic images.

Figure 17:
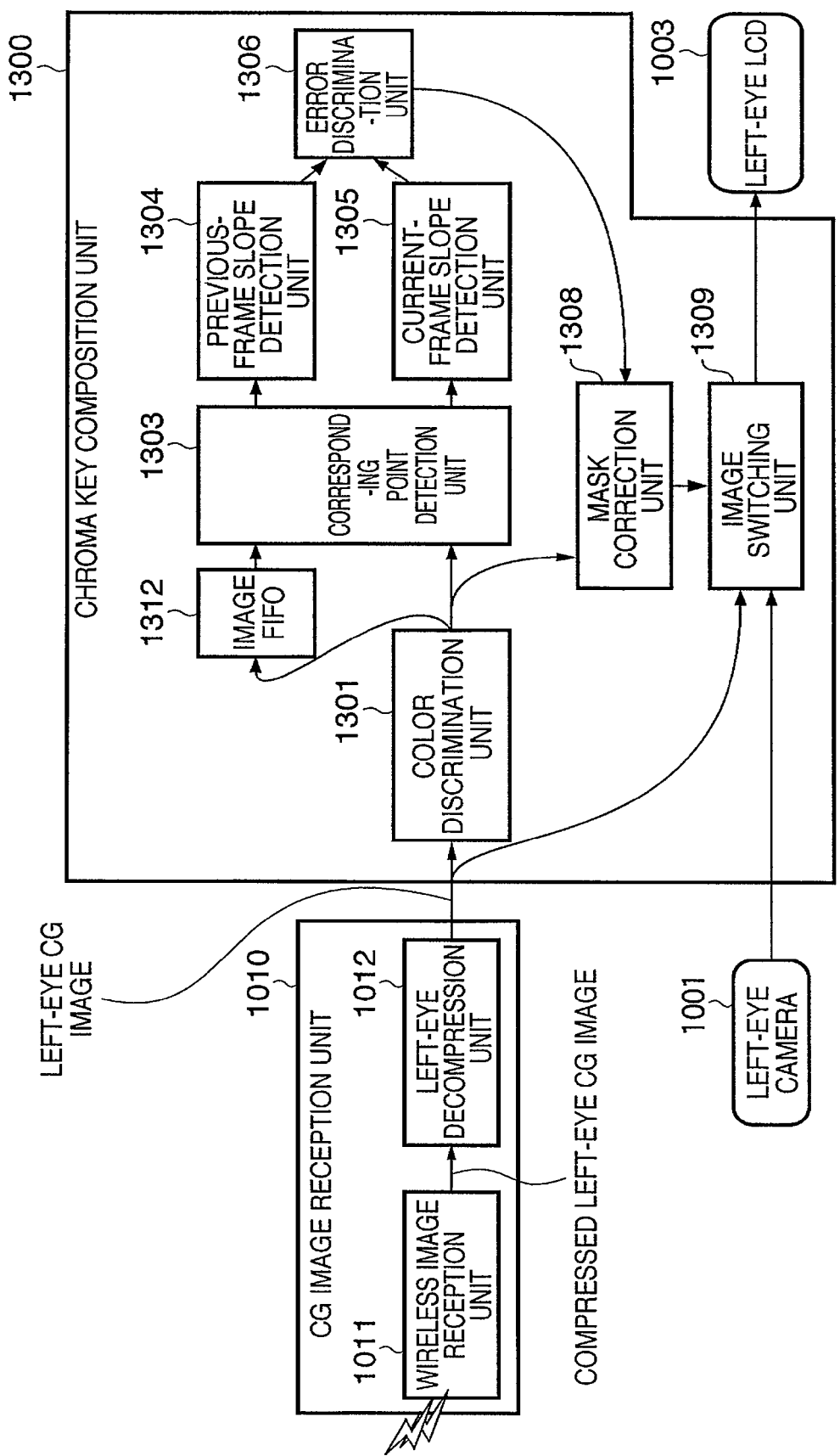
FIG. 17 is a block diagram showing the functional arrangement of a left-eye part of an HMD 1000 according to the third embodiment of the present invention.

FIG. 17 is a block diagram showing an example of the functional arrangement of an HMD 1000 required to present an image of the chroma key composition result to the left eye of an observer. Since a series of processes required to present an image of the chroma key composition result to the left eye of the observer will be described hereinafter, the arrangement required to present an image of the chroma key composition result to the right eye is not shown in FIG. 17. However, in this embodiment as well, since images of the chroma key composition results are presented to the right and left eyes of the observer by the same series of processes, the arrangement and processes required to present an image of the chroma key composition result to the right eye of the observer will be easily understood by those who are skilled in the art.

A CG image reception unit 1010 is the same as that shown in FIG. 4. However, as described above, since the processes required to present an image of the chroma key composition result to the left eye will be described, FIG. 17 shows only the arrangement for the left eye of those of the CG image reception unit 1010.

A chroma key composition unit 1300 will be described below. As described above, FIG. 17 shows only the arrangement required to present an image of the chroma key composition result to the left eye in association with the chroma key composition unit 1300. In order to present an image of the chroma key composition result to the right eye, the same arrangement as that of the chroma key composition unit 1300 shown in FIG. 17 needs to be added to the chroma key composition unit 1300 for the right eye. In this case, of course, a camera and LCD need to be prepared for the right eye, and need to be connected to the chroma key composition unit 1300 as in the first embodiment.

The chroma key composition unit 1300 receives a decompressed left-eye CG image, and the input left-eye CG image is input to a color discrimination unit 1301 and image switching unit 1309.

The color discrimination unit 1301 generates a mask image by executing the same processing as that executed by the right- and left-eye color discrimination units 1102 and 1101 shown in FIG. 4. The generated mask image is input to a subsequent image FIFO store 1312, corresponding point detection unit 1303, and mask correction unit 1308. The image FIFO store 1312 holds a mask image for one frame, and outputs data in a FIFO (first in, first out) manner, as is well known. Therefore, the image FIFO 1312 outputs a mask image of the immediately preceding frame. The mask image of the immediately preceding frame output from the image FIFO 1312 is input to the corresponding point detection unit 1303.

The corresponding point detection unit 1303 receives the mask image output from the color discrimination unit 1301 (current-frame mask image) and that output from the image FIFO 1312 (previous-frame mask image). Then, the corresponding point detection unit 1303 executes processing in which the right- and left-eye mask images are replaced by the current- and previous-frame mask images in the processing described in the first embodiment as that to be executed by the corresponding point detection unit 1103 shown in FIG. 4. Of course, the processing for specifying a pixel position on the other mask image corresponding to each of pixels which form a portion that neighbors a chroma key region, in a non-chroma key region on one mask image is not limited to this.

A previous-frame slope detection unit 1304 and current-frame detection unit 1305 execute the same processing as the right- and left-eye slope detection units 1105 and 1104 shown in FIG. 4. That is, the previous-frame slope detection unit 1304 executes the same processing as the right- and left-eye slope detection units 1105 and 1104 using a table (previous-frame mask image table) generated for the previous-frame mask image by the corresponding point detection unit 1303. In this way, the previous-frame slope detection unit 1304 calculates slopes of the boundary between the chroma key region and non-chroma key region. On the other hand, the current-frame detection unit 1305 executes the same processing as the right- and left-eye slope detection units 1105 and 1104 using a table (current-frame mask image table) generated for the current-frame mask image by the corresponding point detection unit 1303. In this way, the current-frame detection unit 1305 calculates slopes of the boundary between the chroma key region and non-chroma key region.

An error discrimination unit 1306 executes the same processing as the error discrimination unit 1106 shown in FIG. 4 using data of the slopes received from the previous- and current-frame slope detection units 1304 and 1305. That is, the error discrimination unit 1306 checks if one of the previous- and current-frame mask images includes an error part.

The error discrimination unit 1306 counts the number of error parts for the current-frame mask image. As a result of counting the number of error parts for all lines of the current-frame mask image, if the count value is equal to or larger than a certain count value (e.g. 10 or more), the error discrimination unit 1306 determines "no error" as a final determination result for the current-frame mask image. The error discrimination unit 1306 outputs flag information indicating this to the subsequent mask correction unit 1308. This is to cope with a scene change or the like, i.e., a case in which the current frame has largely changed from the image of the immediately preceding frame.

The mask correction unit 1308 executes correction processing of an error part for the current-frame mask image received from the color discrimination unit 1301 by the same processing as the right- and left-eye mask correction units 1110 and 1108 shown in FIG. 4.

The image switching unit 1309 executes the same processing as the right- and left-eye image switching units 1111 and 1109 except that the mask image to be used is the current-frame mask image.

With the aforementioned processing, the boundary line between the chroma key color and a CG object can be correctly detected in an input image with losses using similarities of images of successive frames, thereby satisfactorily detecting the chroma key color required for chroma key composition.

In the first and second embodiments, input images with losses were corrected using similarities of stereoscopic images upon execution of the chroma key composition. For this reason, upon capturing a nearby object, since stereoscopic images have poor similarities, satisfactory results cannot be obtained. In this embodiment, even when nearby objects are captured, since similarities of images of respective frames are used, satisfactory correction can be implemented.

However, this embodiment cannot obtain satisfactory results when the positions and orientations of the cameras are changed, i.e., when images of respective frames have few similarities.

Fourth Embodiment

This embodiment does not always correct the mask images unlike in the above embodiments, and checks (using information indicating whether or not any error is detected upon wireless reception of compressed CG images, information indicating the degree of disparity, and the like) whether or not to correct mask images. In this embodiment, mask images are corrected by the method described in the first embodiment.

As one characteristic feature of this embodiment, whether or not to correct mask images is determined by seeing if any error occurs during a communication upon wirelessly receiving compressed CG images.

When mask images are always corrected like in the above embodiments, side-effects may be produced, resulting in adverse influences. Therefore, since mask images are corrected upon occurrence of an error during a communication, unwanted correction can be avoided, and correction with fewer side-effects can be implemented.

As another characteristic feature of this embodiment, whether or not to correct mask images is determined in consideration of the degree of disparity. Correction uses a similarity between the right and left images. However, since the right and left images have a disparity, they are slightly different. In general, right and left images of a farther object look similar to each other, and those of a nearer object look different from each other. Hence, upon determining whether or not to apply correction by comparing the slopes of contours, it is determined for a farther object that correction is required even when the slopes have a small difference, and it is determined for a nearer object that correction is not executed unless the slopes have a large difference. In this way, appropriate correction can be applied. A near or far object can be determined based on the disparity. Hence, whether or not to apply correction is determined in consideration of the degree of disparity. As a result, unwanted correction can be avoided, and correction with few side-effects can be implemented.

Figure 18:
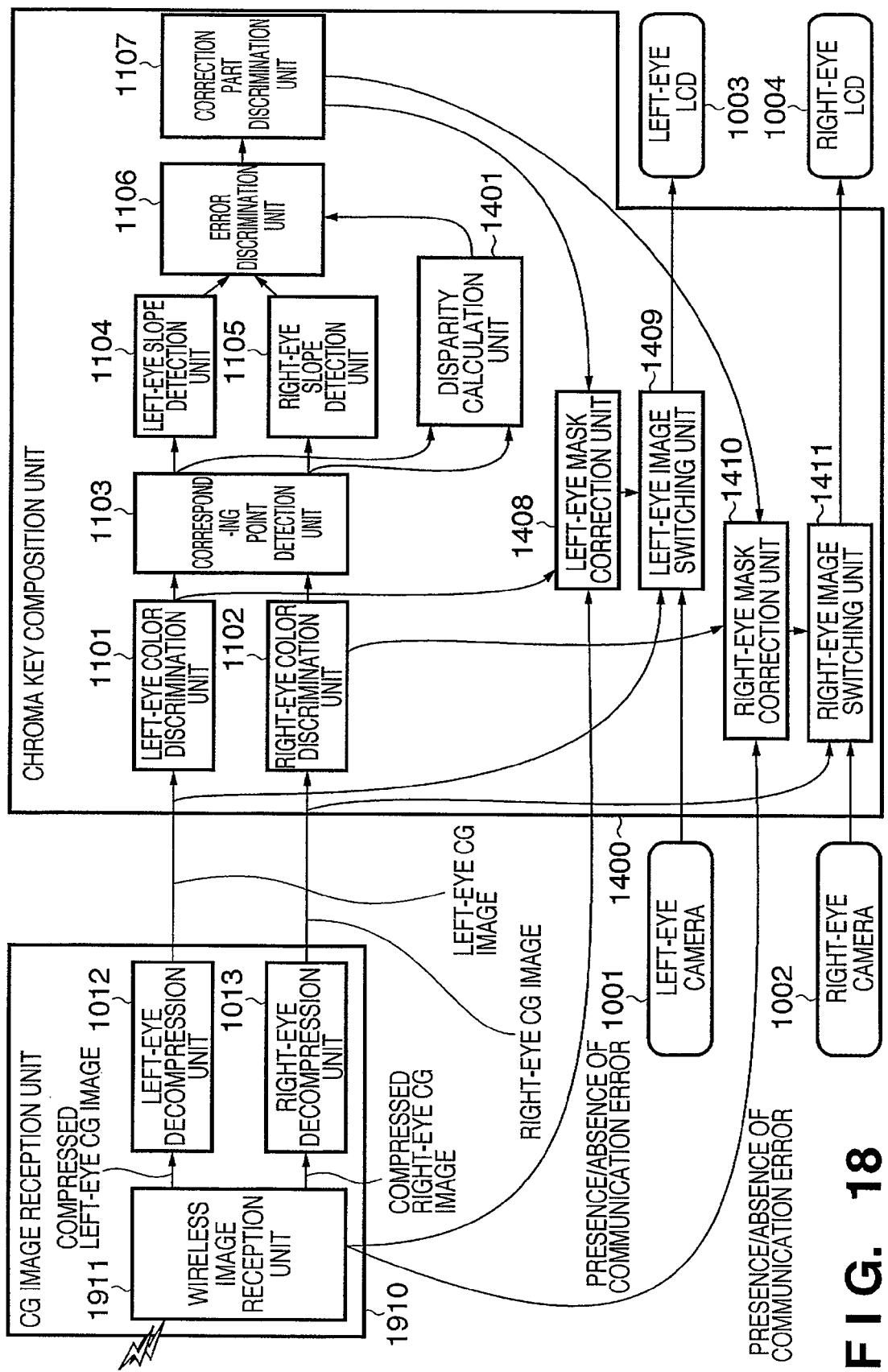
FIG. 18 is a block diagram showing the functional arrangement of an HMD 1000 according to the fourth embodiment of the present invention.

FIG. 18 is a block diagram showing the functional arrangement of an HMD 1000 according to this embodiment. The same reference numerals in FIG. 18 denote the same parts as in FIG. 4, and a repetitive description will be avoided.

A wireless image reception unit 1911 receives compressed right- and left-eye CG images wirelessly transmitted from a computer 3000, and outputs them to right- and left-eye decompression units 1013 and 1012, as in the wireless image reception unit 1011. Furthermore, the wireless image reception unit 1911 checks whether or not an error has occurred during a communication for this reception. Since such checking processing is a known technique, a description thereof will not be given. Flag information indicating the checking result of the wireless image reception unit 1911 (i.e., flag information indicating whether or not a communication error has occurred) is output to right- and left-eye mask correction units 1410 and 1408.

When the received flag indicates that a communication error has occurred, the right- and left-eye mask correction units 1410 and 1408 execute the aforementioned processing executed by the right- and left-eye mask correction units 1110 and 1108. On the other hand, when the flag information indicates that no communication error occurs, the operations of the right- and left-eye mask correction units 1410 and 1408 are inhibited.

In this manner, unwanted correction can be avoided in the absence of a communication error.

Furthermore, a disparity calculation unit 1401 calculates a disparity with respect to a line as an object to be processed by executing the same processing as the disparity calculation unit 1201. The disparity calculation unit 1401 outputs "the absolute value of the calculated disparity value+3" to an error discrimination unit 1106.

The error discrimination unit 1106 checks if the difference between slopes VSL3 and VSR3 is equal to or larger than that threshold (in the present example the absolute value of the calculated disparity value+3). As a result of checking, if the difference is equal to or larger than the threshold, the error discrimination unit 1106 determines that one of the right- and left-eye CG images includes an error part. Of course, the calculation method of the threshold using the disparity is not limited to the above formula. It is preferable to control an increase/decrease in threshold, so that the threshold increases with increasing disparity, and decreases with decreasing disparity.

In this way, it is determined for a far-distance object with a small disparity that losses are included when the slopes of the contours have even a small difference. Also, it is determined for a near-distance object with a large disparity that losses are not included even when the slopes of the contours have a difference to some extent.

With the aforementioned processing, whether or not to apply correction upon execution of chroma key composition can be determined using information indicating whether or not any error is detected during a communication, and information indicating the degree of disparity. For this reason, unwanted correction can be avoided, and correction with few side-effects can be implemented.

This embodiment uses similarities of stereoscopic images in correction, but may use those of images of successive frames in correction as an alternative.

Fifth Embodiment

This embodiment detects the motion of an HMD 1000. As a result of such detection, if any motion is detected, the processing for correcting mask images is executed using the arrangement according to the first embodiment; otherwise, the processing for correcting mask images is executed using the arrangement according to the third embodiment.

Various methods of detecting the motion of the HMD 1000 are available. In this embodiment, an acceleration sensor such as an accelerometer is attached to the HMD 1000. If an acceleration indicated by the measurement result of this acceleration sensor is equal to or larger than a certain threshold value, it is determined that the HMD 1000 is "moving"; otherwise, it is determined that the HMD 1000 is "not moving".

The correction using similarities of stereoscopic images described in the first embodiment can be implemented without posing any problem even when the HMD moves quickly, since the right and left images are captured at the same time. However, since the right and left images are not identical, they cannot often be accurately corrected.

The correction using similarities of images of successive frames described in the third embodiment can expect accurate correction results since images of neighboring frames have high similarities when the HMD stands still. However, when the HMD is moving, the previous and current frames have a low similarity, and accurate correction is disturbed.

Hence, these two correction methods are switched depending on the movement of the HMD, thus implementing correction with higher accuracy.

Figure 19:
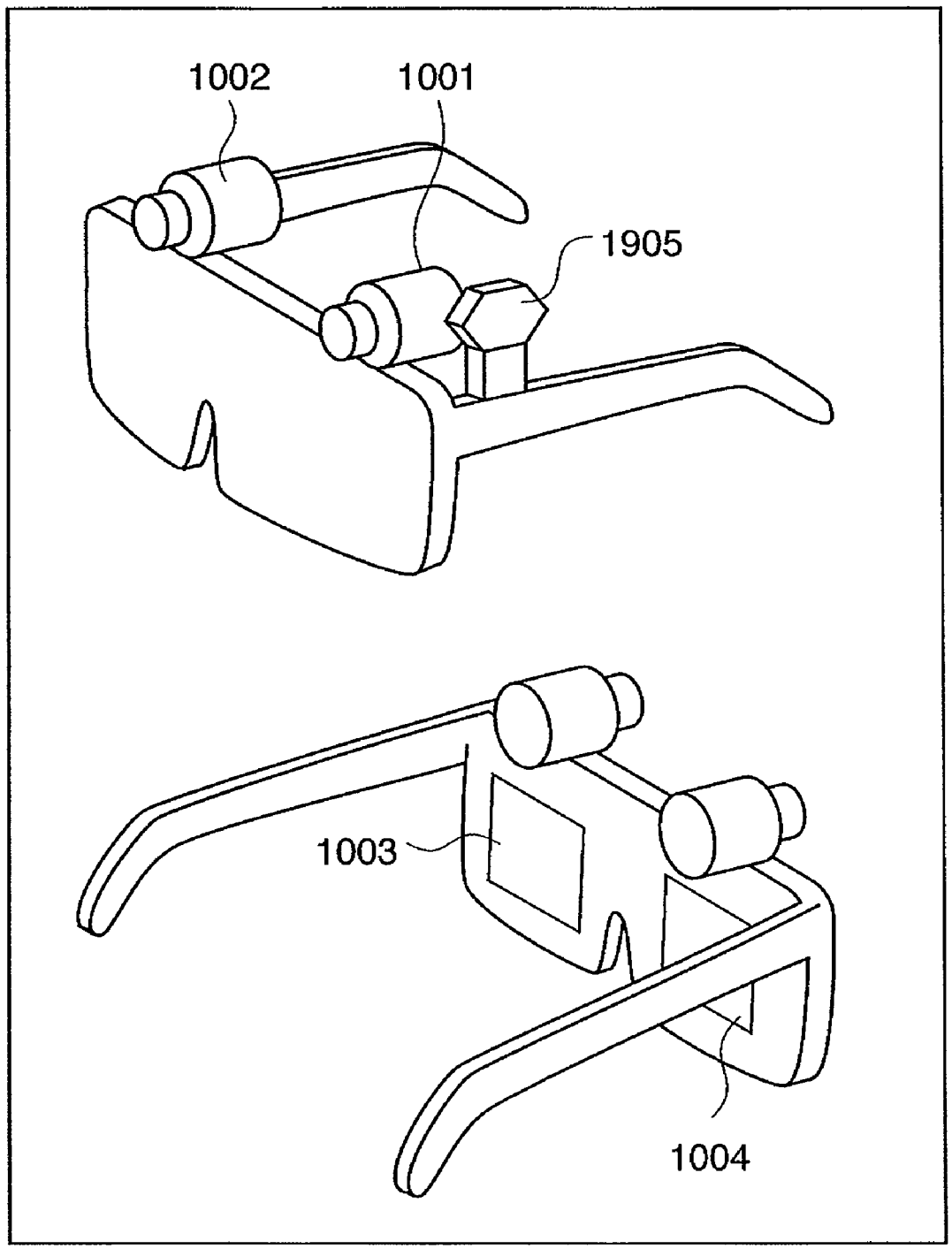
FIG. 19 shows an example of the outer appearance of an HMD 1000 according to the fifth embodiment of the present invention.

FIG. 19 shows an example of the outer appearance of the HMD 1000 according to this embodiment. As shown in FIG. 19, an acceleration sensor 1905 is attached to the HMD 1000 according to this embodiment.

Figure 20:
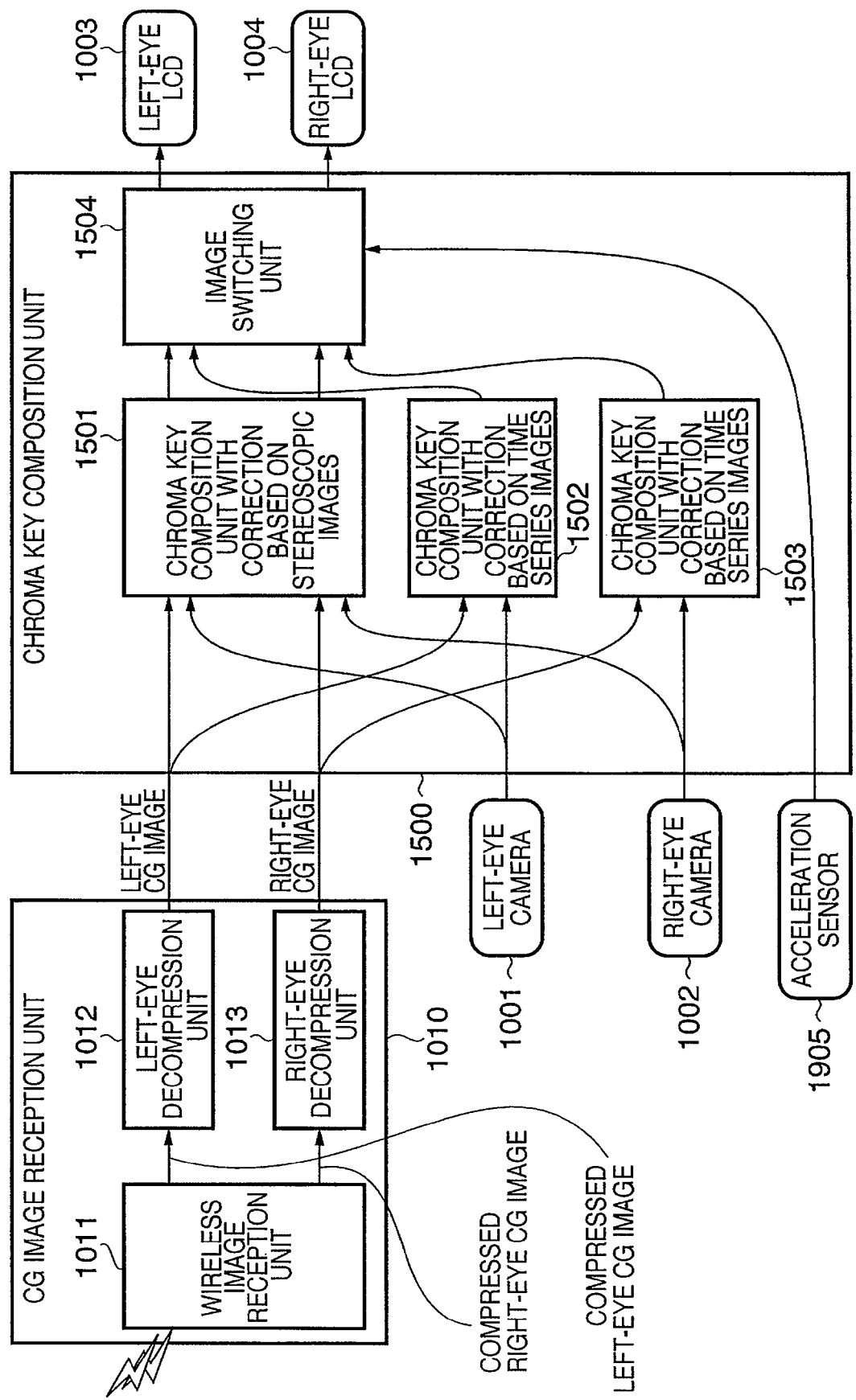
FIG. 20 is a block diagram showing the functional arrangement of the HMD 1000 according to the fifth embodiment of the present invention.

FIG. 20 is a block diagram showing the functional arrangement of the HMD 1000 according to this embodiment. The same reference numerals in FIG. 20 denote the same parts as in FIG. 4, and a repetitive description thereof will be avoided.

A chroma key composition unit 1501 corresponds to the chroma key composition unit 1100 shown in FIG. 4. Chroma key composition units 1503 and 1502 respectively correspond to those for the right and left eyes with the arrangement of the chroma key composition unit 1300 shown in FIG. 17.

Upon reception of the measurement result (acceleration) from the acceleration sensor 1905, an image switching unit 1504 compares this acceleration with a threshold value which is set in advance. As a result of this comparison, if the acceleration is equal to or larger than the threshold, the image switching unit 1504 determines that the HMD is "moving", and outputs images output from the chroma key composition unit 1501 to subsequent right- and left-eye LCDs 1004 and 1003. On the other hand, if the acceleration is smaller than the threshold, the image switching unit 1504 determines that the HMD is "not moving", and outputs images output from the chroma key composition units 1503 and 1502 to the subsequent right- and left-eye LCDs 1004 and 1003.

With the aforementioned processing, when the HMD is moving, images including losses are corrected using similarities of stereoscopic images upon execution of the chroma key composition; when the HMD is not moving, correction can be done using similarities of images of successive frames.

With this arrangement, correction can be made by using the merits of both the correction based on images of successive frames which is applicable upon capturing a nearby object, and correction based on stereoscopic images which is applicable when the image capturing system is moving.

Other Embodiments

The objects of the present invention can be achieved as follows. That is, a recording medium (or storage medium), which records a program code (software) that can implement the functions of the above-mentioned embodiments is supplied to a system or apparatus. Such storage medium is, of course, a computer-readable storage medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-115989, filed on Apr. 25, 2007, which is hereby incorporated by reference herein in its entirety.

What is claimed is:

1. An image processing apparatus, comprising:
a real-space image acquisition unit operable to acquire a real space image;
a virtual space image acquisition unit configured to acquire a first virtual space image including a chroma key region defined by a pixel group having a chroma key color which is set in advance;
a composition unit operable to execute chroma key composition of the first virtual space image on the real space image based on said chroma key color included in the first virtual space image; and
an output unit adapted to output, to a display device, a composite image generated by the chroma key composition processing of said composition unit,
the image processing apparatus characterized by further comprising:
a determination unit configured to determine whether or not an error part exists at a boundary between the chroma key region and a non-chroma key region, based on a second virtual space image acquired by said virtual space image acquisition unit; and
a correction unit operable to correct the error part, if said determination unit determines that the error part exists, based on a chroma key region of the second virtual space image.

2. The apparatus according to claim 1, further comprising:
a generation unit operable to generate a mask image defined by sets of bits indicating a chroma key region and a non-chroma key region based on said chroma key color included in the first virtual space image,
wherein said determination unit determines whether or not an error part exists based on the mask image and another mask image as a mask image of the second virtual space image.

3. The apparatus according to claim 2, characterized in that said determination unit is configured:
to calculate a difference between a slope of a boundary at a position of interest at the boundary between a chroma key region and a non-chroma key region in the mask image, and a slope of a boundary at a corresponding position corresponding to the position of interest at the boundary between a chroma key region and a non-chroma key region in the other mask image;
to determine, if the difference is not less than a pre-set threshold, that an error part exists in one of the mask image and the other mask image, and to determine, if the difference is smaller than the pre-set threshold, that the error part does not exist;
to calculate, if it is determined that the error part exists, a change in slope of the boundary in the vicinity of the position of interest, and a change in slope of the boundary in the vicinity of the corresponding position; and
to determine, if the change in slope of the boundary in the vicinity of the position of interest is smaller than the change in slope of the boundary in the vicinity of the corresponding position, that the corresponding position corresponds to the error part, and to determine, if the change in slope of the boundary in the vicinity of the position of interest is larger than the change in slope of the boundary in the vicinity of the corresponding position, that the position of interest corresponds to the error part.

4. The apparatus according to claim 3, wherein if the corresponding position corresponds to the error part, said correction unit is operable to correct the other mask image, so that the slope of the boundary at the corresponding position equals the slope of the boundary in the vicinity of the position of interest, and
if the position of interest corresponds to the error part, said correction unit corrects the mask image, so that the slope of the boundary at the position of interest equals the slope of the boundary in the vicinity of the corresponding position.

5. The apparatus according to claim 2, characterized in that said determination unit is configured:
to calculate, for respective lines, a positional difference between a position, in the mask image, of the boundary between the chroma key region and the non-chroma key region in the mask image, and a position, in the other mask image, of the boundary between the chroma key region and the non-chroma key region in the other mask image, and to calculate a change amount of the calculated positional differences for respective lines;

to determine, if the change amount is not less than a pre-set threshold, that an error part exists in one of the mask image and the other mask image, and to determine, if the change amount is smaller than the pre-set threshold, that an error part does not exist;

to calculate, if it is determined that the error part exists, a change in slope of the boundary in the vicinity of a position of interest at the boundary between a chroma key region and a non-chroma key region in the mask image, and a change in slope of the boundary in the vicinity of a corresponding position corresponding to the position of interest at the boundary between a chroma key region and a non-chroma key region in the other mask image; and to determine, if the change in slope of the boundary in the vicinity of the position of interest is smaller than the change in slope of the boundary in the vicinity of the corresponding position, that the corresponding position corresponds to the error part, and to determine, if the change in slope of the boundary in the vicinity of the position of interest is larger than the change in slope of the boundary in the vicinity of the corresponding position, that the position of interest corresponds to the error part.

6. The apparatus according to claim 5, characterized in that if the corresponding position corresponds to the error part, said correction unit corrects the other mask image, so that a position of the boundary in a line of the corresponding position becomes a position deviated from the position of interest by a positional difference according to the positional difference calculated for a line before that line, and if the position of interest corresponds to the error part, said correction unit is configured to correct the mask image, so that a position of the boundary in a line of the position of interest becomes a position deviated from the corresponding position by a positional difference according to the positional difference calculated for a line before that line.

7. The apparatus according to claim 2, characterized in that the mask image is generated by said generation unit from a virtual space image for one eye of a user, which is acquired by said virtual space image acquisition unit, and the other mask image is generated by said generation unit from a virtual space image for the other eye of the user, which is acquired by said virtual space image acquisition unit.

8. The apparatus according to claim 2, characterized in that the mask image is generated by said generation unit from a virtual space image of a frame of interest acquired by said virtual space image acquisition unit, and the other mask image is generated by said generation unit from a virtual space image before the frame of interest, which is acquired by said virtual space image acquisition unit.

9. The apparatus according to claim 1, characterized in that said image processing apparatus is adapted to be head mounted, and said virtual space image acquisition unit comprises:

reception unit configured to receive a virtual space image wirelessly transmitted from an external apparatus in a compressed state; and decompression unit adapted to decompress the compressed virtual space image received by said reception unit.

10. The apparatus according to claim 9, characterized by further comprising:

a unit adapted to determine whether or not an error occurs in a communication for reception by said reception unit; and a unit adapted to inhibit, if an error does not occur in the communication, correction by said correction unit.

11. The apparatus according to claim 3, characterized by further comprising control unit operable to control an increase/decrease in the threshold according to a positional difference between the position of interest and the corresponding position.

12. An image processing method, comprising:

acquiring a real space image;

acquiring a first virtual space image including a chroma key region defined by a pixel group having a chroma key color which is set in advance;

executing chroma key composition of the first virtual space image on the real space image based on the chroma key color included in the first virtual space image; and outputting a composite image generated by the chroma key composition processing in the composition step to a display device, said method characterized by further comprising:

determining based on a second virtual space image, acquired in the virtual space image acquisition step whether or not an error part exists at a boundary between the chroma key region and a non-chroma key region; and correcting, if it is determined in the determination step that the error part exists, the error part based on a chroma key region of the second virtual space image.

13. A machine-readable storage device storing a computer program which when loaded into a computer and executed performs an image processing method, the method comprising:

acquiring a real space image;

acquiring a first virtual space image including a chroma key region defined by a pixel group having a chroma key color which is set in advance;

executing chroma key composition of the first virtual space image on the real space image based on the chroma key color included in the first virtual space image; and outputting a composite image generated by the chroma key composition processing in the composition step to a display device, said method characterized by further comprising:

determining based on a second virtual space image, acquired in the virtual space image acquisition step whether or not an error part exists at a boundary between the chroma key region and a non-chroma key region; and correcting, if it is determined in the determination step that the error part exists, the error part based on a chroma key region of the second virtual space image.

* * * * *